United States Patent
Mukherjee et al.

(10) Patent No.: US 9,565,451 B1
(45) Date of Patent: Feb. 7, 2017

(54) PREDICTION DEPENDENT TRANSFORM CODING

(71) Applicant: Google Inc., Mountain View, CA (US)

(72) Inventors: Debargha Mukherjee, Cupertino, CA (US); Yongzhe Wang, Los Angeles, CA (US); Jingning Han, Santa Clara, CA (US)

(73) Assignee: GOOGLE INC., Mountain View, CA (US)

( * ) Notice: Subject to any disclaimer, the term of this patent is extended or adjusted under 35 U.S.C. 154(b) by 167 days.

(21) Appl. No.: 14/529,662

(22) Filed: Oct. 31, 2014

(51) Int. Cl.
*H04B 1/66* (2006.01)
*H04N 19/61* (2014.01)
*H04N 19/176* (2014.01)
*H04N 19/593* (2014.01)

(52) U.S. Cl.
CPC ............ *H04N 19/61* (2014.11); *H04N 19/176* (2014.11); *H04N 19/593* (2014.11)

(58) Field of Classification Search
CPC .... H04N 19/103; H04N 19/105; H04N 19/11; H04N 19/119; H04N 19/12; H04N 19/136
USPC .................. 375/240, 240.01, 240.09, 240.1, 240.18, 375/240.2, 240.24
See application file for complete search history.

(56) References Cited

U.S. PATENT DOCUMENTS

| | | | |
|---|---|---|---|
| 4,774,574 A | 9/1988 | Daly et al. | |
| 5,068,724 A | 11/1991 | Krause et al. | |
| 5,091,782 A | 2/1992 | Krause et al. | |
| 5,121,216 A | 6/1992 | Chen et al. | |
| 5,146,324 A | 9/1992 | Miller et al. | |
| 5,224,062 A | 6/1993 | McMillan, Jr. et al. | |
| 5,235,623 A | 8/1993 | Sugiyama et al. | |
| 5,260,782 A | 11/1993 | Hui | |
| 5,274,442 A | 12/1993 | Murakami et al. | |
| 5,341,440 A | 8/1994 | Earl et al. | |

(Continued)

FOREIGN PATENT DOCUMENTS

| | | |
|---|---|---|
| JP | 2010199959 | 9/2010 |
| WO | WO2010039015 | 1/2010 |

(Continued)

OTHER PUBLICATIONS

Xin, J., K. N. Ngan, and G. Zhu, "Combined inter-intra prediction for high definition video coding," Picture Coding Symposium, 2007.

(Continued)

*Primary Examiner* — Dominic D Saltarelli
(74) *Attorney, Agent, or Firm* — Young Basile Hanlon & MacFarlane, P.C.

(57) ABSTRACT

Encoding and decoding using prediction dependent transform coding are provided. Encoding and decoding using prediction dependent transform coding may include identifying a current input block from a current input frame from an input video stream, generating a prediction block for the current input block, generating a residual block based on a difference between the current input block and the prediction block, generating, by a processor in response to instructions stored on a non-transitory computer readable medium, an encoded block by encoding the residual block based on the prediction block using the using prediction dependent transform coding, including the encoded block in an output bitstream, and outputting or storing the output bitstream.

20 Claims, 15 Drawing Sheets

(56) References Cited

U.S. PATENT DOCUMENTS

| | | | |
|---|---|---|---|
| 5,422,963 | A | 6/1995 | Chen et al. |
| 5,444,800 | A | 8/1995 | Kim |
| 5,635,938 | A | 6/1997 | Komoto |
| 5,737,020 | A | 4/1998 | Hall et al. |
| 5,764,805 | A | 6/1998 | Martucci et al. |
| 5,767,908 | A | 6/1998 | Choi |
| 5,872,866 | A | 2/1999 | Strongin et al. |
| 5,903,669 | A | 5/1999 | Hirabayashi |
| 6,108,383 | A | 8/2000 | Miller et al. |
| 6,115,501 | A | 9/2000 | Chun et al. |
| 6,134,350 | A | 10/2000 | Beck |
| 6,167,161 | A | 12/2000 | Oami |
| 6,408,025 | B1 | 6/2002 | Kaup |
| 6,522,783 | B1 | 2/2003 | Zeng et al. |
| 6,522,784 | B1 | 2/2003 | Zlotnick |
| 6,683,991 | B1 | 1/2004 | Andrew et al. |
| 6,819,793 | B1 | 11/2004 | Reshetov et al. |
| 6,917,651 | B1 | 7/2005 | Yoo et al. |
| 6,934,419 | B2 | 8/2005 | Zlotnick |
| 7,266,149 | B2 | 9/2007 | Holcomb et al. |
| 7,292,634 | B2 | 11/2007 | Yamamoto et al. |
| 7,409,099 | B1 | 8/2008 | Ameres et al. |
| 7,492,823 | B2 | 2/2009 | Lee et al. |
| 7,894,530 | B2 | 2/2011 | Gordon et al. |
| 7,912,318 | B2 | 3/2011 | Nakayama |
| 7,936,820 | B2 | 5/2011 | Watanabe et al. |
| 8,000,546 | B2 | 8/2011 | Yang et al. |
| 8,094,950 | B2 | 1/2012 | Sasagawa |
| 8,116,374 | B2 | 2/2012 | Gordon et al. |
| 8,494,290 | B2 | 7/2013 | Cohen et al. |
| 8,582,656 | B2 | 11/2013 | Lin et al. |
| 8,687,699 | B1 | 4/2014 | Wen |
| 9,106,933 | B1 | 8/2015 | Bankoski et al. |
| 2002/0168114 | A1 | 11/2002 | Valente |
| 2002/0196983 | A1 | 12/2002 | Kobayashi |
| 2003/0048943 | A1 | 3/2003 | Ishikawa |
| 2003/0146925 | A1 | 8/2003 | Zhao et al. |
| 2004/0057519 | A1 | 3/2004 | Yamamoto et al. |
| 2004/0125204 | A1 | 7/2004 | Yamada et al. |
| 2004/0184537 | A1 | 9/2004 | Geiger et al. |
| 2005/0025246 | A1 | 2/2005 | Holcomb |
| 2005/0147163 | A1 | 7/2005 | Li et al. |
| 2005/0249291 | A1 | 11/2005 | Gordon et al. |
| 2006/0045368 | A1 | 3/2006 | Mehrotra |
| 2006/0098738 | A1 | 5/2006 | Cosman et al. |
| 2006/0115168 | A1 | 6/2006 | Kobayashi |
| 2006/0133682 | A1 | 6/2006 | Tu et al. |
| 2006/0210181 | A1 | 9/2006 | Wu et al. |
| 2006/0239575 | A1 | 10/2006 | Abe et al. |
| 2006/0251330 | A1 | 11/2006 | Toth et al. |
| 2007/0036223 | A1 | 2/2007 | Srinivasan |
| 2007/0078661 | A1 | 4/2007 | Sriram et al. |
| 2007/0140349 | A1 | 6/2007 | Burazerovic |
| 2007/0183500 | A1 | 8/2007 | Nagaraj et al. |
| 2007/0201554 | A1 | 8/2007 | Sihn |
| 2007/0211953 | A1 | 9/2007 | Sasagawa |
| 2007/0223583 | A1 | 9/2007 | Nagai et al. |
| 2008/0008246 | A1 | 1/2008 | Mukherjee et al. |
| 2008/0043848 | A1 | 2/2008 | Kuhn |
| 2008/0084929 | A1 | 4/2008 | Li |
| 2008/0123977 | A1 | 5/2008 | Moriya et al. |
| 2008/0253463 | A1 | 10/2008 | Lin et al. |
| 2008/0310512 | A1 | 12/2008 | Ye et al. |
| 2009/0041128 | A1 | 2/2009 | Howard |
| 2009/0049641 | A1 | 2/2009 | Pullins et al. |
| 2009/0067503 | A1 | 3/2009 | Jeong et al. |
| 2009/0122864 | A1 | 5/2009 | Palfner et al. |
| 2009/0123066 | A1 | 5/2009 | Moriya et al. |
| 2009/0228290 | A1 | 9/2009 | Chen et al. |
| 2009/0274382 | A1 | 11/2009 | Lin et al. |
| 2010/0020867 | A1 | 1/2010 | Wiegand et al. |
| 2010/0086049 | A1 | 4/2010 | Ye et al. |
| 2010/0246951 | A1 | 9/2010 | Chen et al. |
| 2010/0290520 | A1 | 11/2010 | Kamisli et al. |
| 2010/0309286 | A1 | 12/2010 | Chen et al. |
| 2011/0032983 | A1 | 2/2011 | Sezer |
| 2011/0090959 | A1 | 4/2011 | Wiegand et al. |
| 2011/0182352 | A1 | 7/2011 | Pace |
| 2011/0206135 | A1 | 8/2011 | Drugeon et al. |
| 2011/0243249 | A1 | 10/2011 | Lee et al. |
| 2011/0274162 | A1 | 11/2011 | Zhou |
| 2011/0286516 | A1 | 11/2011 | Lim et al. |
| 2011/0293009 | A1 | 12/2011 | Steinberg et al. |
| 2011/0293012 | A1 | 12/2011 | Au et al. |
| 2012/0008683 | A1 | 1/2012 | Karczewicz et al. |
| 2012/0057630 | A1 | 3/2012 | Saxena et al. |
| 2012/0128066 | A1 | 5/2012 | Shibahara et al. |
| 2012/0162455 | A1 | 6/2012 | Kim |
| 2012/0177116 | A1 | 7/2012 | Panusopone et al. |
| 2012/0201298 | A1 | 8/2012 | Panusopone et al. |
| 2012/0230418 | A1 | 9/2012 | Sole Rojals et al. |
| 2012/0308128 | A1 | 12/2012 | Oosake |
| 2013/0003824 | A1 | 1/2013 | Guo et al. |
| 2013/0003828 | A1 | 1/2013 | Cohen et al. |
| 2013/0003856 | A1 | 1/2013 | Saxena et al. |
| 2013/0034152 | A1 | 2/2013 | Song |
| 2013/0070845 | A1 | 3/2013 | Lim et al. |
| 2013/0089145 | A1 | 4/2013 | Guo et al. |
| 2013/0128974 | A1 | 5/2013 | Chien et al. |
| 2013/0136175 | A1 | 5/2013 | Wang et al. |
| 2013/0156328 | A1 | 6/2013 | Wang et al. |
| 2013/0176211 | A1 | 7/2013 | Inada et al. |
| 2013/0243083 | A1 | 9/2013 | Sezer |
| 2013/0272422 | A1 | 10/2013 | Lee et al. |
| 2013/0336410 | A1 | 12/2013 | Nguyen et al. |
| 2014/0086314 | A1 | 3/2014 | Hebel et al. |
| 2014/0092956 | A1 | 4/2014 | Panusopone et al. |
| 2014/0204999 | A1* | 7/2014 | Park ............... H04N 19/136 375/240.02 |

FOREIGN PATENT DOCUMENTS

| | | |
|---|---|---|
| WO | WO2010039288 | 4/2010 |
| WO | WO2011049399 | 4/2011 |
| WO | WO2012005099 A1 | 1/2012 |
| WO | 2014075552 | 5/2014 |

OTHER PUBLICATIONS

McCann et al., "Samsung's Response to the call for proposals on video compression technology" JCTVC of ITU-T SG16 WP3 and ISO/IEC JTC1/SC29/WG11; 1st meeting; Dresden, DE, Apr. 15-23, 2010; JCTVC124; 42 pages.

Wiegand et al, "Overview of the H 264/AVC Video Coding Standard," IEEE Transactions on Circuits and Systems for Video Technology, vol. 13, No. 7, pp. 568, 569, Jul. 1, 2003.

Chen, Y, J. Han, T. Nanjundaswamy, and K. Rose, "A joint spatio-temporal filtering approach to efficient prediction in video compression," Picture Coding Symposium, 2013.

B. Bross, H. Kirchoffer, H. Schwarz, T. Wiegand,"Fast intra encoding for fixed maximum depth of transform quadtree," JCTVC-C311_r1, Guangzhou, CN, Oct. 2010.

B. Bross, W.-J Han, J.-R. Ohm, G. J. Sullivan, T. Wiegand: "High efficiency video coding (HEVC) text specification draft 7", Document of Joint Collaborative Team on Video Coding, JCTVC-I1003-d4, Apr. 27-May 7, 2012.

Bankoski et al. "Technical Overview of VP8, An Open Source Video Codec for the Web". Dated Jul. 11, 2011.

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Chen J et al. "Description of scalable video coding technology proposal by Qualcomm (configuration)", 11. JCT-VC Meeting; 102. MPEG Meeting; Oct. 10, 2012 Oct. 19, 2012; Shanghai; (Joint Collaborative Team on Video Coding of ISO/IEC JTC1/SC29/WG11 and ITU-T SG.16); URL:http://wftp3.itu.int/av-arch/jctvc-site/, No. JCTVC-K0035, Oct. 2, 2012, all pages.

(56) References Cited

OTHER PUBLICATIONS

Chen J. et al., "TE:Simulation results for various max. number of transform quadtree depth," MPEG Meeting, Guangzhou, Chima; No. M18236; Oct. 28, 2010.
Chen P. et al., "Video coding using extended block sizes," VCEG Meeting, San Diego, US; No. VCEG-AJ23, Oct. 15, 2008.
Guo L et al.: "Transform Selection for Inter-Layer Texture Prediction in Scalable Video Coding", 11. JCT-VC Meeting; 102; MPEG Meeting; Oct. 10, 2012-Oct. 19, 2012; Shanghai; (Joint Collaborative Team on Video Coding of ISO/IEC JTC1/WG11 and ITU-T SG.16); URL:http://wftp3.itu.int/av-arch/jctvc-site/,, No. JCTVC-K0321, Oct. 7, 2012, all pages.
Han et al., "Jointly Optimized Spatial Prediction and Block Transform for Video and Image Coding," IEEE Transactions on Image Processing, vol. 21, No. 4 (Apr. 2012).
Han et al., "Toward Jointly Optimal Spatial Prediction and Adaptive Transform in Video/Image Coding," ICASSP 2010 (Dallas, TX, Mar. 14-19, 2010).
Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.
ISR and Written Opinion of the International Searching Authority, for Int'l Application No. PCT/US2012/021475; Mar. 29, 2012.
ISR and Written Opinion of the International Searching Authority, for Int'l Application No. PCT/US2012/020167; Mar. 29, 2012.
ISR, & Written Opinion of the International Searching Authority for International Application No. ISR/US2013/062216 (cs39797), Dec. 12, 2013, 12 pages.
Krit Panusopone, et al. "Efficient Transform Unit Representation," Joint Collaborative Team on Video Coding (JCT-VC) of UTU-T SG16 WP3 and ISO/IEC JTC1/SC29/WG11 4nd Meeting: Daegu, KR, Jan. 22, 2011.
Lee B. et al., "Hierarchical variable block transform," JCT-VC Meeting, Geneva, Switzerland; No. JCTVC-B050; Jul. 24, 2010.
Lee T et al.: "TE12.1: Experimental results of transform unit quadtree/2-level test", 3 JCT-VC Meeting; 94. MPEG Meeting; Oct. 7, 2010-Oct. 15, 2010; Guangzhou; (Joint Collaborative Team on Video Coding of ISO/IEC JTC1/SC29/WG11 and ITU-T SG.16); URL:http://wftp3.itu.int/av-arch/jctvc-site/,, No. JCTVC-C200, Oct. 2, 2010, all pages.
McCann K. et al.; "Video coding technology proposal by samsung (and BBC)," JCT-VC Meeting; Dresden, Germany, Apr. 15, 2010.
Mozilla, "Introduction to Video Coding Part 1: Transform Coding", Video Compression Overview, Mar. 2012, 171 pp.
Overview; VP7 Data Format and Decoder. Version 1.5. On2 Technologies, Inc. Dated Mar. 28, 2005.
Krit Panusopone et al., "Flexible Picture Partitioning", JCT-VC (Joint Collaborative Team on Video Coding) JCTVC-C260, Meeting, Oct. 7-Oct. 15, 2010.
Saxena A et al.: "On secondary transforms for Intra BVL residue", 13. JCT-VC Meeting; 104. MPEG Meeting; Apr. 18, 2013-Apr. 26, 2013; Incheon; (Joint Collaborative Team on Video Coding of ISO/IEC JTC1/SC29/WG11 and ITU-T SG.16); URL:http://wftp3.itu.int/av-arch/jctvc-site/, No. JCTVC-M0033, Apr. 9, 2013, all pages.
Saxena A et al.: "On secondary transforms for intra/inter prediction residual", 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16); URL:http://wftp3.itu.int/av-arch/jctvc-site/,, No. JCTVC-I0232, Apr. 17, 2012, all pages.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
Sikora, T. et al., Shape-adaptive DCT for generic coding of video, Circuits and Systems for Video Technology, IEEE Transactions on vol. 5, Issue 1, p. 59-62, Feb. 1, 1995.
VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.
Wiegand et al. "BoG report: residual quadtree structure" JCTVC-C319_r1, Guangzhou, CN Oct. 2010.
Wiegand, T; B. Bross, J. Ohm, G. Sullivan, "WD1: Working Draft 1 of High-Efficiency Video Coding," JCTVC-C403, Guangzhou, CN, Oct. 7-15, 2010.

* cited by examiner

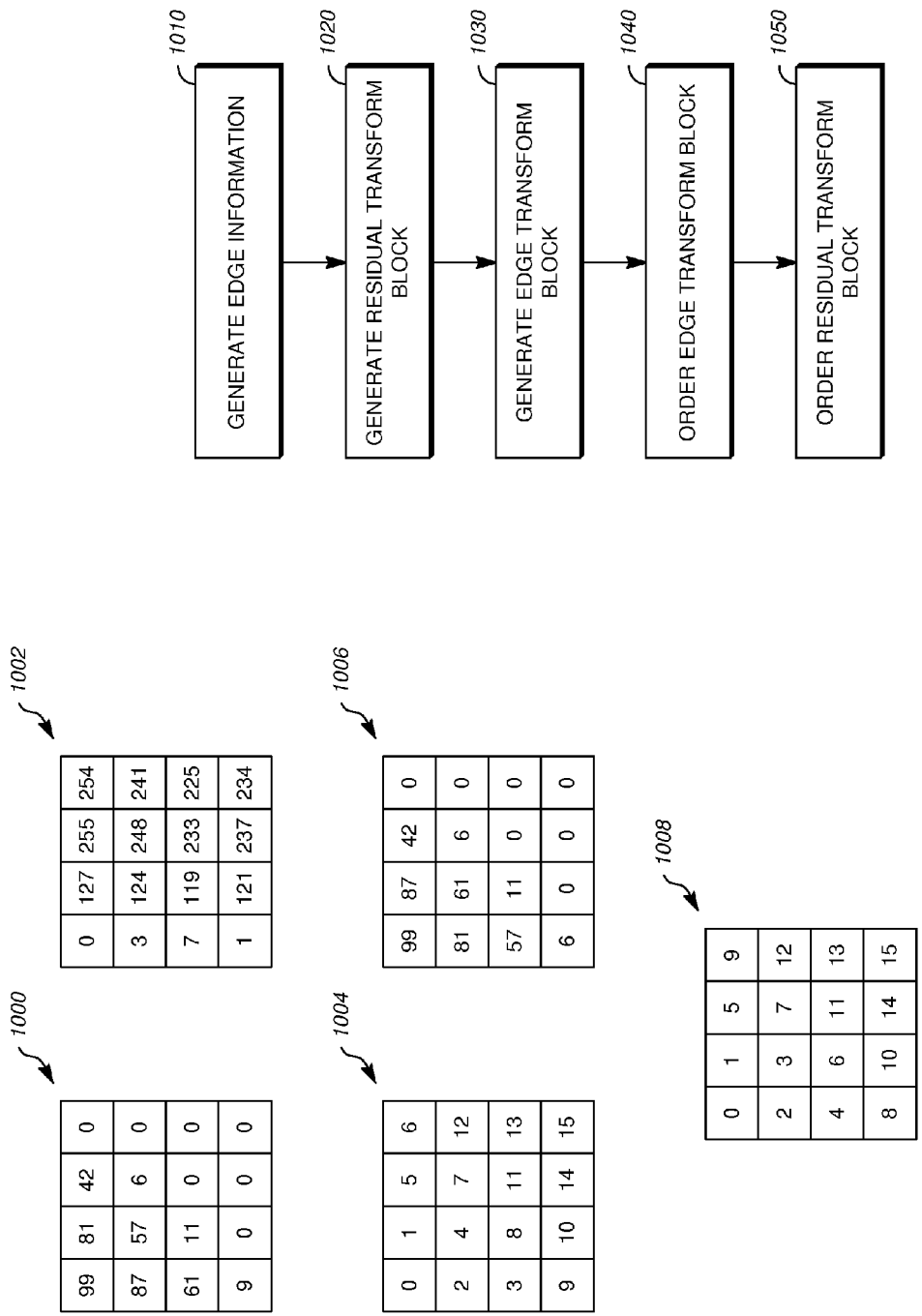

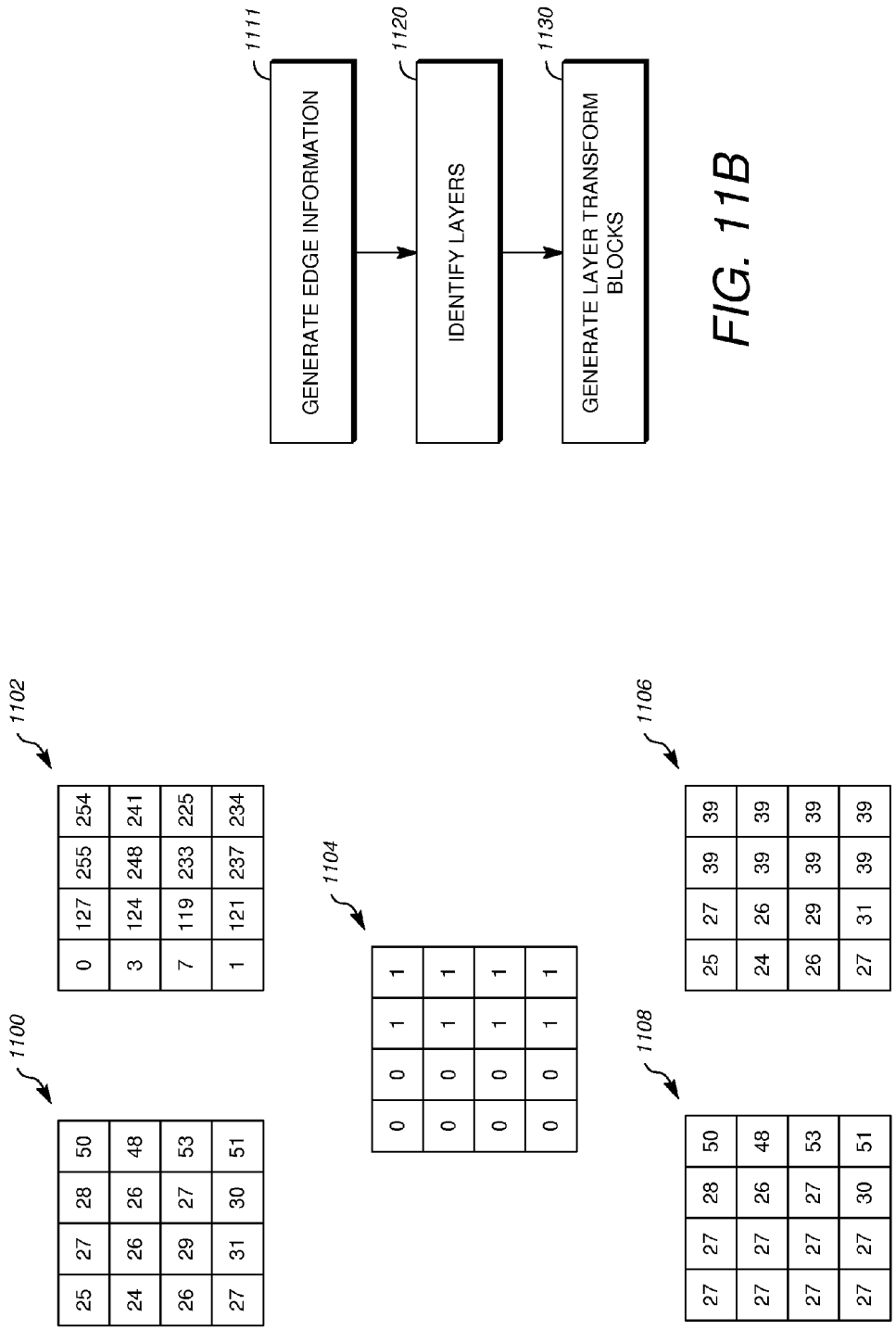

PREDICTION DEPENDENT TRANSFORM CODING

BACKGROUND

Digital video can be used, for example, for remote business meetings via video conferencing, high definition video entertainment, video advertisements, or sharing of user-generated videos. Due to the large amount of data involved in video data, high performance compression is needed for transmission and storage. Accordingly, it would be advantageous to provide high resolution video transmitted over communications channels having limited bandwidth.

SUMMARY

This application relates to encoding and decoding of video stream data for transmission or storage. Disclosed herein are aspects of systems, methods, and apparatuses for encoding and decoding using prediction dependent transform coding.

An aspect is a method for performing prediction dependent transform coding, which may be performed by a processor in response to instructions stored on a non-transitory computer readable medium, and which may include identifying a current input block from a current input frame from an input video stream, generating a prediction block for the current input block, generating a residual block based on a difference between the current input block and the prediction block, generating, by a processor in response to instructions stored on a non-transitory computer readable medium, an encoded block by encoding the residual block based on the prediction block using the using prediction dependent transform coding, including the encoded block in an output bitstream, and outputting or storing the output bitstream.

Another aspect is a method for performing prediction dependent transform coding, which may be performed by a processor in response to instructions stored on a non-transitory computer readable medium, and which may include identifying a current input block from a current input frame from an input video stream, generating a prediction block for the current input block, generating a residual block based on a difference between the current input block and the prediction block, and generating, by a processor in response to instructions stored on a non-transitory computer readable medium, an encoded block by encoding the residual block based on the prediction block using the using prediction dependent transform coding. In some implementations, encoding the residual block using the using prediction dependent transform coding may include generating an edge information block based on the prediction block, determining a prediction dependent transform based on the edge information block, generating a residual transform block by transforming the residual block using the prediction dependent transform, and generating the encoded block by encoding the residual transform block. In some implementations, prediction dependent transform coding may include including the encoded block in an output bitstream, and outputting or storing the output bitstream.

Another aspect is a method for prediction dependent transform coding, which may be performed by a processor in response to instructions stored on a non-transitory computer readable medium, and which may include identifying a current input block from a current input frame from an input video stream, generating a prediction block for the current input block, generating a residual block based on a difference between the current input block and the prediction block, and generating an output bitstream. In some implementations, generating the output bitstream may include encoding, by a processor in response to instructions stored on a non-transitory computer readable medium, the residual block based on the prediction block. In some implementations, encoding the residual block based on the prediction block may include determining a prediction dependent transform mode. In some implementations, on a condition that the prediction dependent transform mode is a generating mode, encoding the residual block based on the prediction block may include generating a prediction dependent transform based on edge information from the prediction block, generating a residual transform block by transforming the residual block using the prediction dependent transform, generating an encoded block based on the residual transform block, and including the encoded block in the output bitstream. In some implementations, on a condition that the prediction dependent transform mode is a ordering mode, encoding the residual block based on the prediction block may include generating a residual transform block by transforming the residual using a defined transform, generating an edge information block based on the prediction block, generating an edge information transform block by transforming the edge information block using the defined transform, identifying a scan order representing a plurality of edge information transform coefficients from the edge information block in descending order of magnitude, generating an encoded block by entropy coding the residual transform block using the scan order, and including the encoded block in the output bitstream. In some implementations, on a condition that the prediction dependent transform mode is a layering mode, encoding the residual block based on the prediction block may include generating an edge information block based on the prediction block, identifying a plurality of layers from the residual block based on the edge information block, generating a plurality of layer transform blocks by transforming each respective layer from the plurality of layers, generating a plurality of encoded layers by encoding each respective layer transform block from the plurality of layer transform blocks, and including the plurality of encoded layers in the output bitstream. In some implementations, on a condition that the prediction dependent transform mode is a select mode, encoding the residual block based on the prediction block may include identifying a defined transform from a plurality of defined transforms based on the prediction block, generating a residual transform block by transforming the residual block using the defined transform, generating an encoded block based on the residual transform block, and including the encoded block in the output bitstream, In some implementations, on a condition that the prediction dependent transform mode is an express mode, encoding the residual block based on the prediction block may include identifying a predicted transform based on the prediction block, identifying a defined transform from a plurality of defined transforms, generating a residual transform block by transforming the residual block using the defined transform, generating an encoded block by entropy coding the residual transform block based on entropy coding probabilities identified based on the predicted transform, including the encoded block in the output bitstream, generating an encoded transform identifier by entropy coding an identifier indicating the defined transform using the entropy coding probabilities identified based on the predicted transform, and including the encoded transform identifier in the output bitstream. In some implementations, prediction dependent transform coding may include outputting or storing the output bitstream.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein:

FIGS. 10A and 10B show an example of prediction dependent transform coding including ordering transform coefficients in accordance with implementations of this disclosure;

FIGS. 11A and 11B are diagrams of an example of prediction dependent transform coding including coding layers in accordance with implementations of this disclosure;

DETAILED DESCRIPTION

Digital video may be used for various purposes including, for example, remote business meetings via video conferencing, high definition video entertainment, video advertisements, and sharing of user-generated videos. Digital video streams may represent video using a sequence of frames or images. Each frame can include a number of blocks, which may include information indicating pixel attributes, such as color values or brightness. Transmission and storage of video can use significant computing or communications resources. Compression and other coding techniques may be used to reduce the amount of data in video streams.

Encoding a video stream, or a portion thereof, such as a frame or a block, can include using temporal and spatial similarities in the video stream to improve coding efficiency. For example, video coding may include predicting pixel values based on temporal and spatial similarities between pixels. One form of prediction is inter-prediction, which can include predicting values for a portion of a current frame based on one or more reference frames, generating a residual based on the difference between the predicted frame and the source frame, transforming the residual using a defined spatial transform, such as a discrete cosign transform (DCT), and entropy coding the transformed coefficients. In some implementations, the efficiency of predictive video coding may depend on the degree to which the transform utilizes correlation between the residual block and the prediction block. For example, a DCT may ignore some correlation between the residual and the predicted signals. In another example, the encoder may select a transform from a limited set of available transforms, and may include an indication of the selected transform in the bitstream.

In some implementations of prediction dependent transform coding the residual may be coded based on the prediction block. For example, a prediction dependent transform (PDT) may be generated based on the prediction signal independently at the encoder and the decoder, a defined transform may be selected from a set of defined transforms based on the prediction signal independently at the encoder and the decoder, transform coefficients may be ordered based on the prediction signal independently at the encoder and the decoder, pixels may be grouped into layers based on the prediction signal independently at the encoder and the decoder, or entropy coding probabilities may be determined based on the prediction signal. In some implementations, prediction dependent transform coding may improve the coding efficiency by utilizing correlation between the residual and the prediction block.

Figure 1:
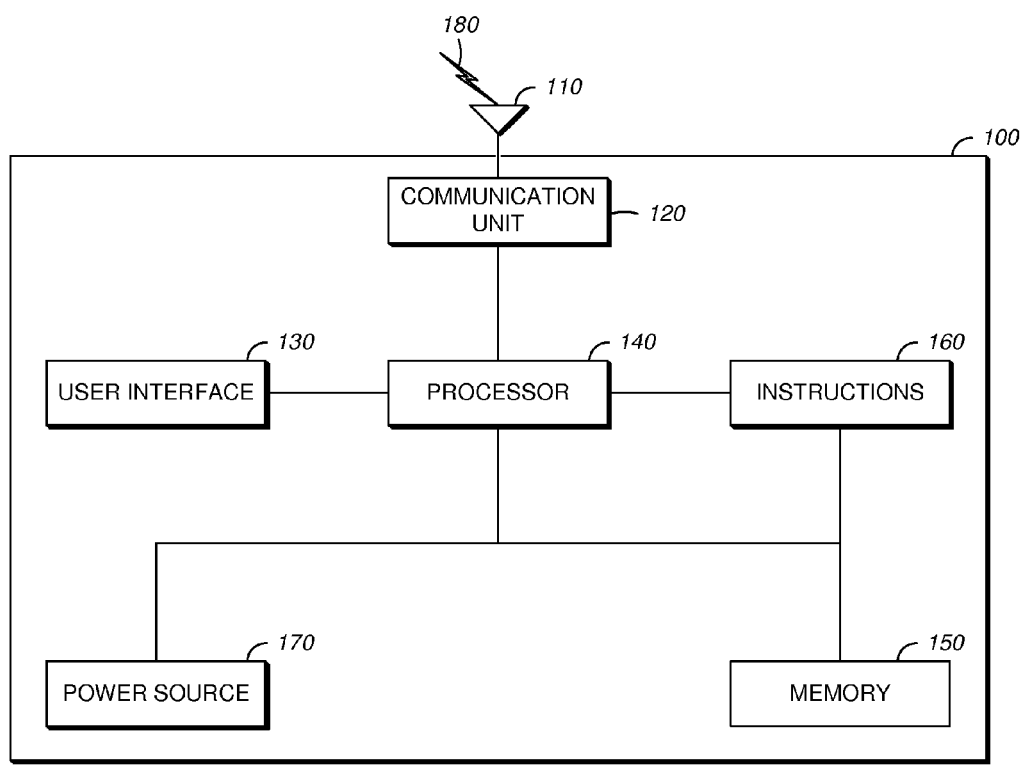
FIG. 1 is a diagram of a computing device in accordance with implementations of this disclosure.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the communication device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180.

For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the communication device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a general purpose processor, a special purpose processor, a conventional processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication device 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication device 110. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
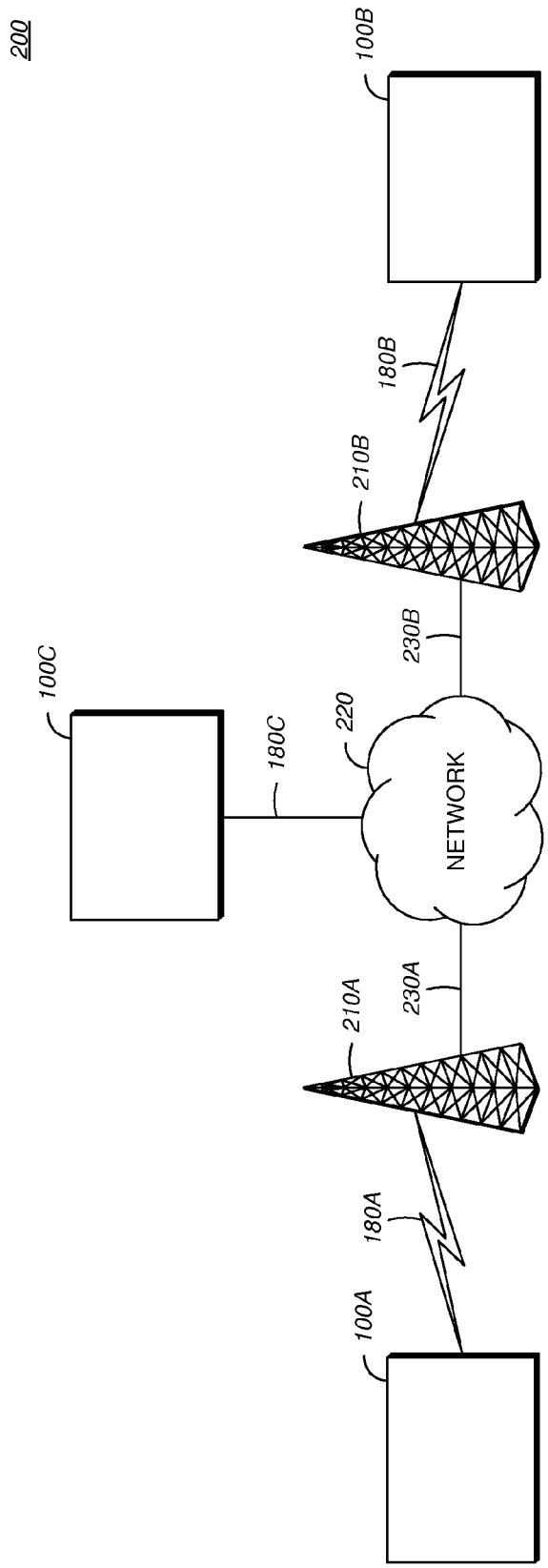
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
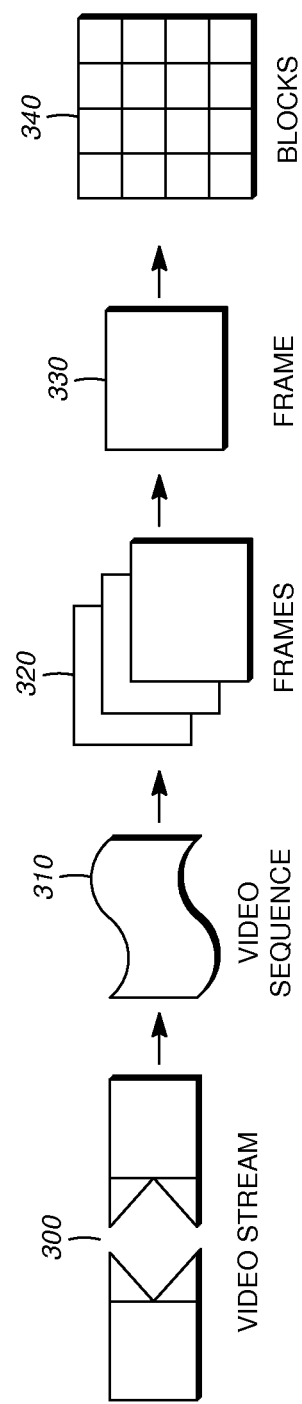
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320. Each frame 330 from the adjacent frames 320 may represent a single image from the video stream. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

The utility of a video coder may depend on compression speed, compression performance, compression fidelity, and decoded visual quality. Compression speed may indicate the time utilized to compress a video. Compression performance may represent the difference in bandwidth required for storing or transmitting the encoded video compared to the source video. Compression fidelity may indicate how well a decoded video matches the source video. Decoded visual quality may represent the visual quality of a decoded video, which may be subjective.

Figure 4:
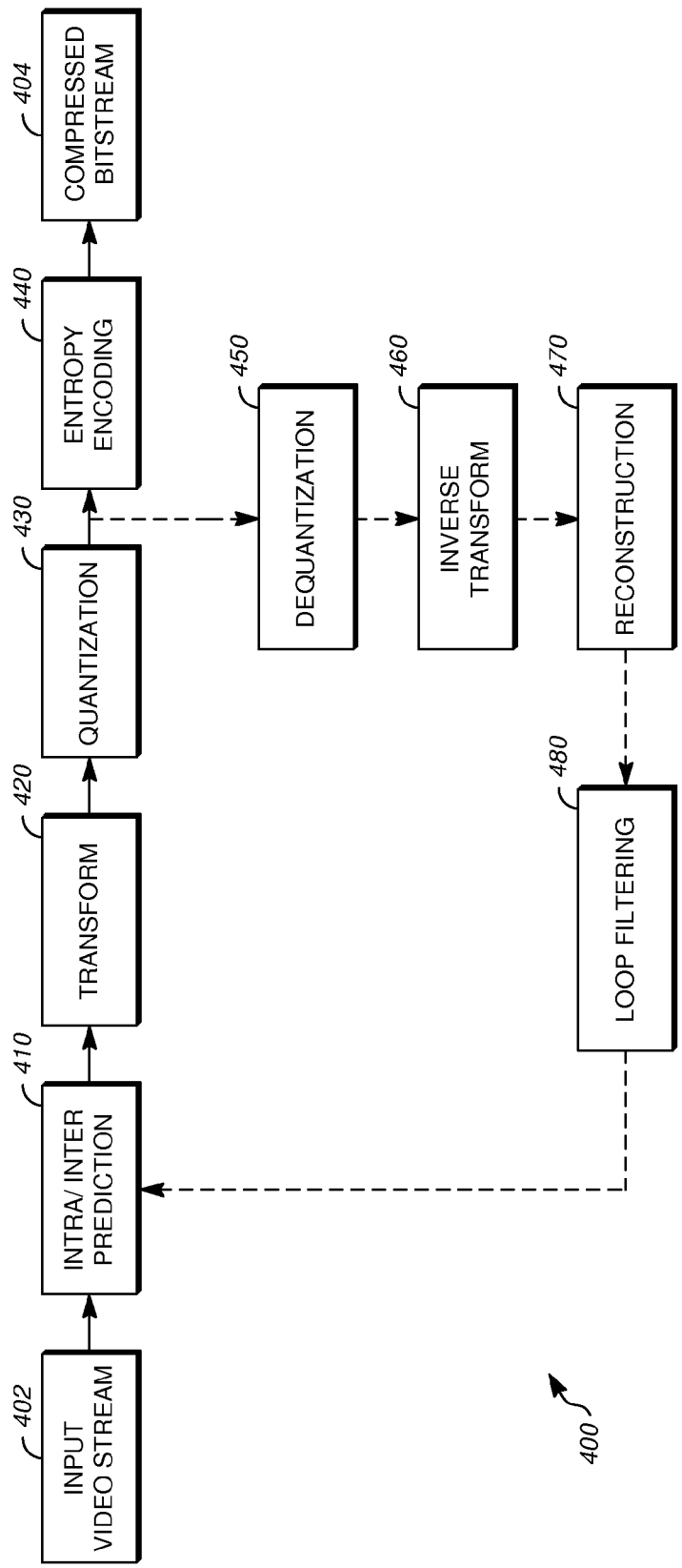
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3 to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a loop filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference block in the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), and the Singular Value Decomposition Transform (SVD). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
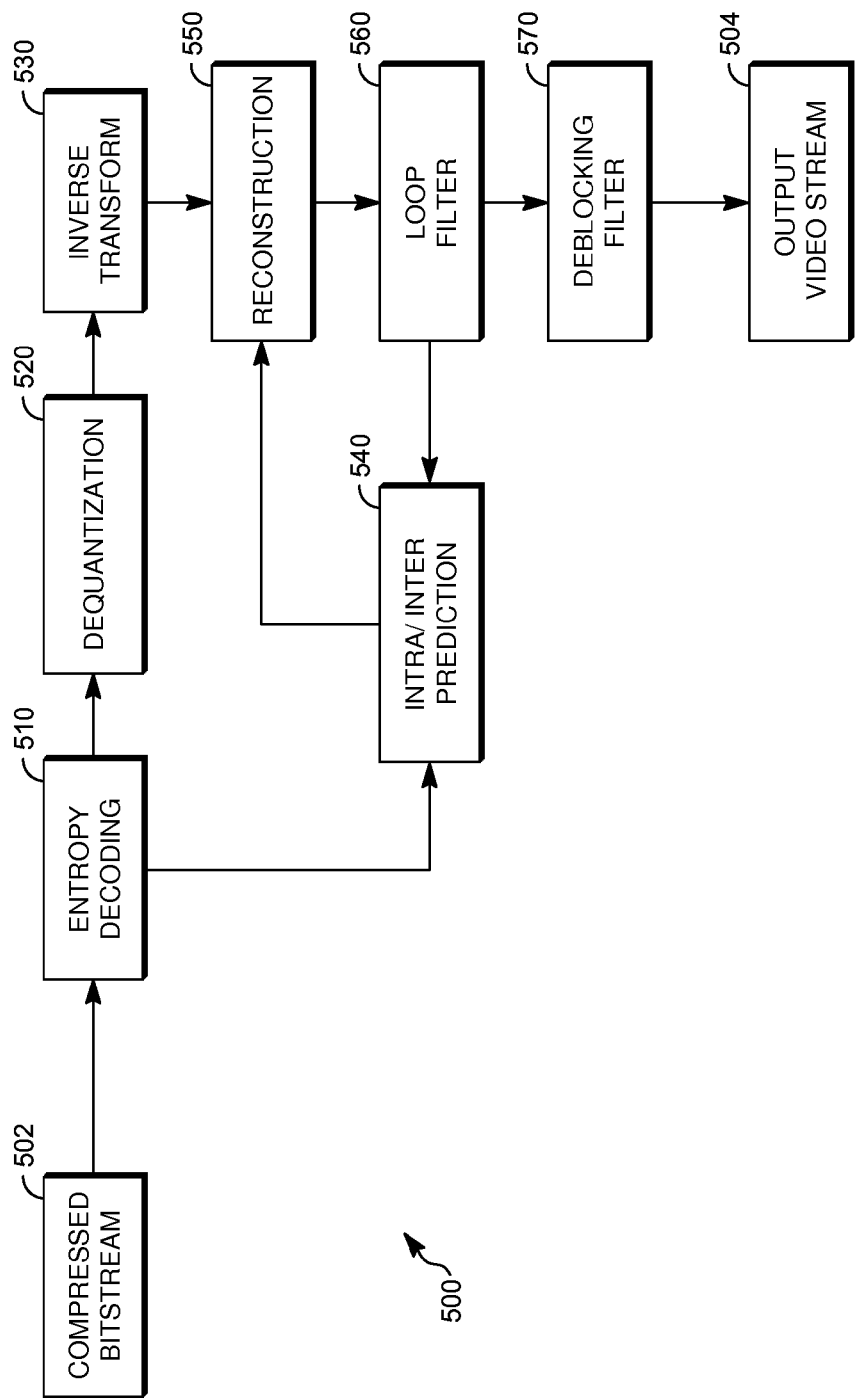
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below, and may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a reconstructed block. The loop filtering unit 480 can be applied to the reconstructed block to reduce distortion, such as blocking artifacts.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to decode video data as described herein. The decoder 400 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a loop filtering unit 560, a deblocking filtering unit 570, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond with the derivative residual block generated by the inverse transformation unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a reconstructed block. The loop filtering unit 560 can be applied to the reconstructed block to reduce blocking artifacts. The deblocking filtering unit 570 can be applied to the reconstructed block to reduce blocking distortion, and the result may be output as the output video stream 504.

Other variations of the decoder 500 can be used to decode the compressed bitstream 502. For example, the decoder 500 can produce the output video stream 504 without the deblocking filtering unit 570.

Figure 6:
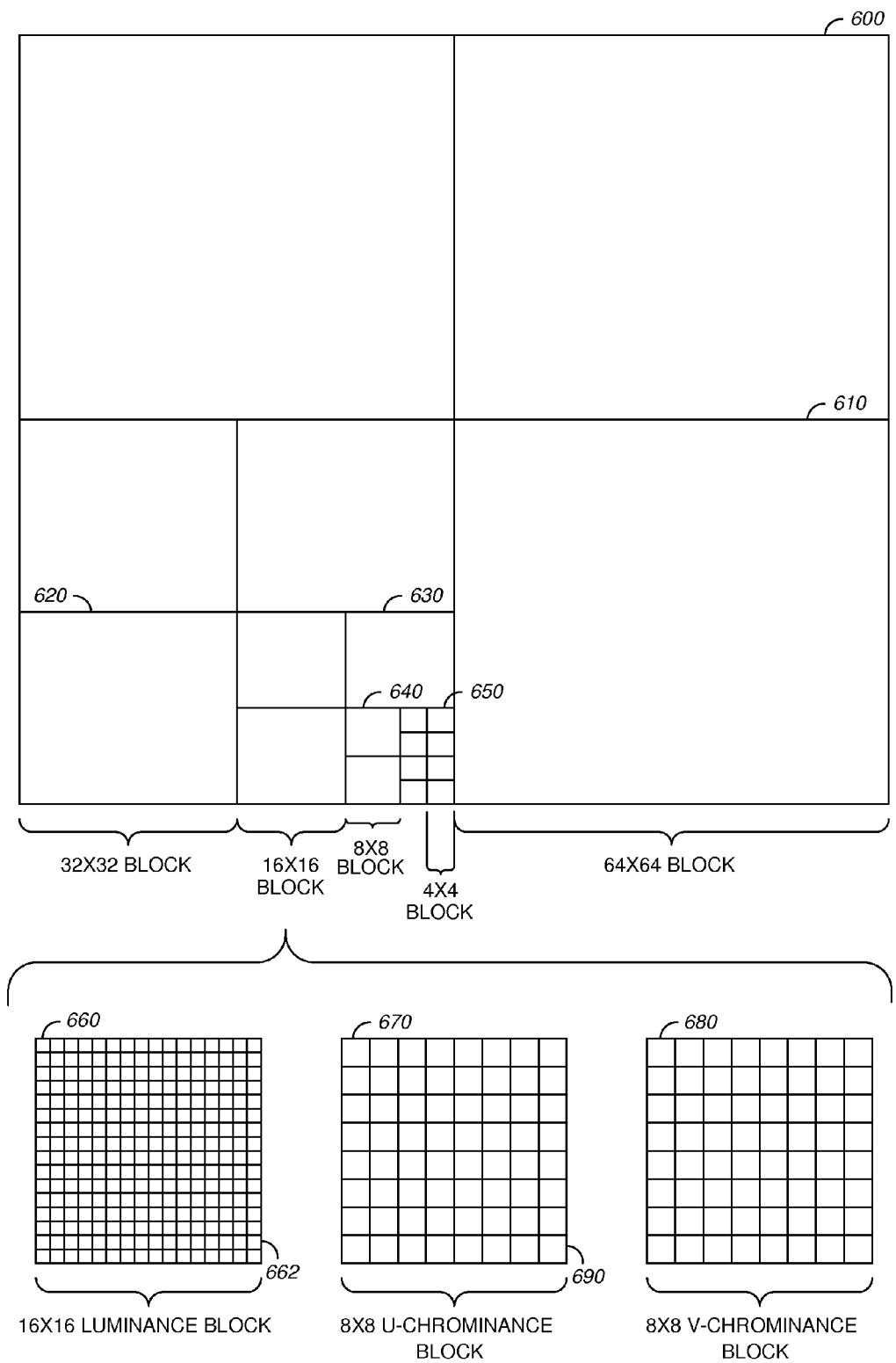
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, which may be referred to as superblocks, in two rows and two columns in a matrix or Cartesian plane. In some implementations, a superblock may be a basic or maximum coding unit. Each superblock may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include may include luminance pixels 662; and two chrominance blocks 670/680, such as a U or Cb chrominance block 670, and a V or Cr chrominance block 680. The chrominance blocks 670/680 may include chrominance pixels 690. For example, the luminance block 660 may include 16×16 luminance pixels 662 and each chrominance block 670/680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the superblock in the top row and left column of a frame may be the first block coded and the superblock immediately to the right of the first block may be the second block coded. The second row from the top may be the second row coded, such that the superblock in the left column of the second row may be coded after the superblock in the rightmost column of the first row.

In some implementations, coding a block may include using quad-tree coding, which may include coding smaller block units with a block in raster-scan order. For example, the 64×64 superblock shown in the bottom left corner of the portion of the frame shown in FIG. 6, may be coded using quad-tree coding wherein the top left 32×32 block may be coded, then the top right 32×z32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame, and using a relatively small amount of information to represent each corresponding chrominance component for the portion of the frame. For example, a portion of a frame may be represented by a high resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location, and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a block or pixel in a reference frame, or a portion of the reference frame, that corresponds with a current block or pixel of a current frame. For example, a reference frame, or a portion of a reference frame, which may be stored in memory, may be searched for the best block or pixel to use for encoding a current block or pixel of the current frame. For example, the search may identify the block of the reference frame for which the difference in pixel values between the reference block and the current block is minimized, and may be referred to as motion searching. In some implementations, the portion of the reference frame searched may be limited. For example, the portion of the reference frame searched, which may be referred to as the search area, may include a limited number of rows of the reference frame. In an example, identifying the reference block may include calculating a cost function, such as a sum of absolute differences (SAD), between the pixels of the blocks in the search area and the pixels of the current block.

In some implementations, the spatial difference between the location of the reference block in the reference frame and the current block in the current frame may be represented as a motion vector. The difference in pixel values between the reference block and the current block may be referred to as differential data, residual data, or as a residual block. In some implementations, generating motion vectors may be referred to as motion estimation, a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although prediction dependent transform coding is described herein with reference to matrix or Cartesian representation of a frame for clarity, a frame may be stored, transmitted, processed, or any combination thereof, in any data structure such that pixel values may be efficiently predicted for a frame or image. For example, a frame may be stored, transmitted, processed, or any combination thereof, in a two dimensional data structure such as a matrix as shown, or in a one dimensional data structure, such as a vector array. In an implementation, a representation of the frame, such as a two dimensional representation as shown, may correspond to a physical location in a rendering of the frame as an image. For example, a location in the top left corner of a block in the top left corner of the frame may correspond with a physical location in the top left corner of a rendering of the frame as an image.

Figure 7:
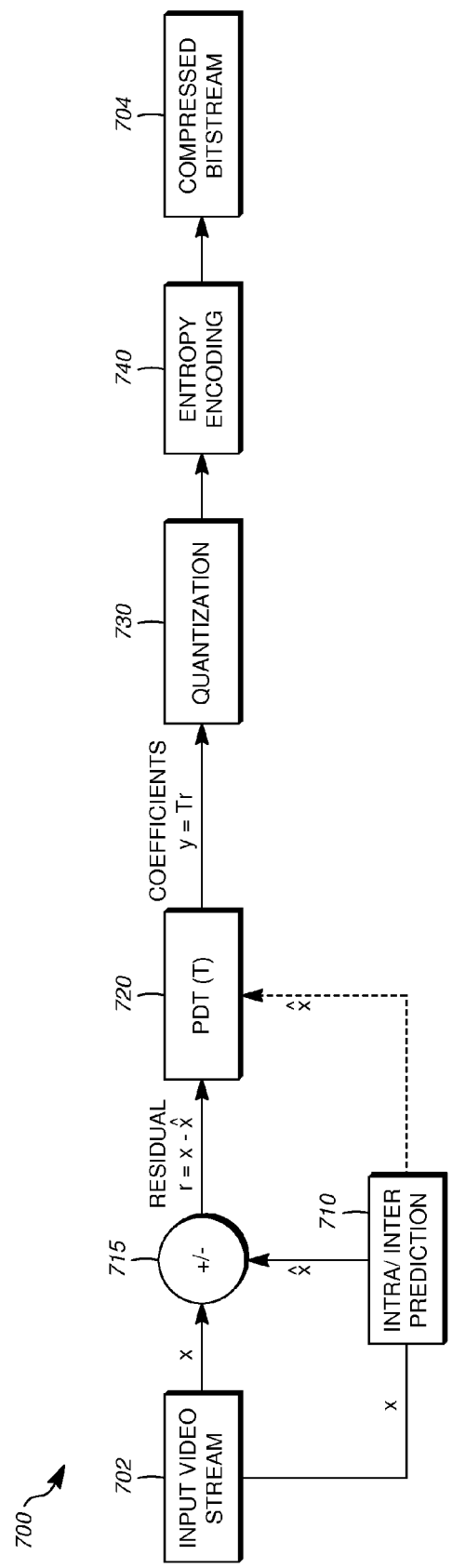
FIG. 7 is a block diagram of an encoder implementing prediction dependent transform coding in accordance with implementations of this disclosure.

FIG. 7 is a block diagram of an encoder 700 implementing prediction dependent transform coding in accordance with implementations of this disclosure. The encoder 700 may be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to encode video data using prediction dependent transform coding. The encoder 700 can be implemented as specialized hardware included, for example, in computing device 100.

In some implementations, the encoder 700 may encode an input video stream 702, such as the video stream 300 shown in FIG. 3, using prediction dependent transform coding, to generate an encoded (compressed) bitstream 704. In some implementations, the encoder 700 may include a forward path 710-740 for generating the compressed bitstream 404. For example, the forward path may include an intra/inter prediction unit 710, a residual unit 715, a prediction dependent transform (PDT) unit 720, a quantization unit 730, an entropy encoding unit 740, or any combination thereof. Although not shown in FIG. 7, in some implementations, the encoder 700 may include a reconstruction path, such as the reconstruction path shown in FIG. 4, to generate a reconstructed frame for encoding other blocks, such as blocks of another frame.

In some implementations, the intra/inter prediction unit 710 may generate a prediction block ($\hat{x}$) based on a current input block (x) from a current input frame of the input video steam 702. The prediction block ($\hat{x}$) may be generated using intra-frame prediction, which may be within a single frame, or inter-frame prediction, which may be from frame to frame. Intra-prediction may include generating the prediction block ($\hat{x}$) from samples in the current frame that have been previously encoded and reconstructed. Inter-prediction may include generating a prediction block ($\hat{x}$) from samples in one or more previously constructed reference frames. In some implementations, the intra/inter prediction unit 710 may generate a motion vector indicating a reference block in a reference frame. For example, the intra/inter prediction unit 710 may generate the motion vector using motion estimation.

In some implementations, the residual unit 715 may generate a residual block (r) based on the current input block (x), which may be a raw block, and the prediction block ($\hat{x}$). For example, the residual unit 715 may subtract the prediction block ($\hat{x}$) from the current block (x) to produce a residual block (r), which may be expressed as $r = x - \hat{x}$.

The prediction dependent transform (PDT) unit 720 may generate a transform block (y) based on the residual block (r) and the prediction block ($\hat{x}$). For example, the prediction dependent transform unit 720 may perform a block-based transform, which may include transforming the residual block (r) into transform coefficients (y) in, for example, the frequency domain. In some implementations, a transform coefficient block (y) may be generated as a function of the prediction dependent transform (T) and the residual (r), which may be expressed as $y = Tr$.

In some implementations, the prediction dependent transform unit 720 may determine a prediction dependent transform (T) based on the prediction block ($\hat{x}$). In some implementations, the prediction dependent transform unit 720 may identify edge information from the prediction block. For example, the edge information may include an edge information block, matrix, or graph, which may be referred to as a similarity matrix or a similarity graph. Although not shown separately in FIG. 7, in some implementations, the coder may include an edge detection unit, and the prediction dependent transform unit 720 may receive the edge information from the edge detection unit.

Figure 12:
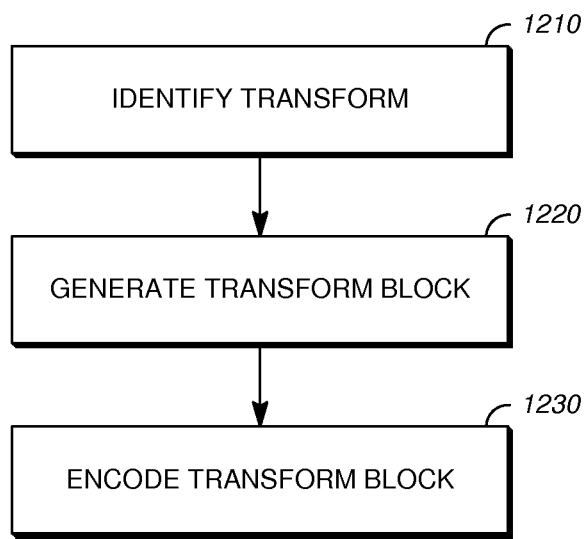
FIG. 12 is a diagram of an example of prediction dependent transform coding including identifying a defined transform from a set of defined transforms in accordance with implementations of this disclosure.
Figure 13:
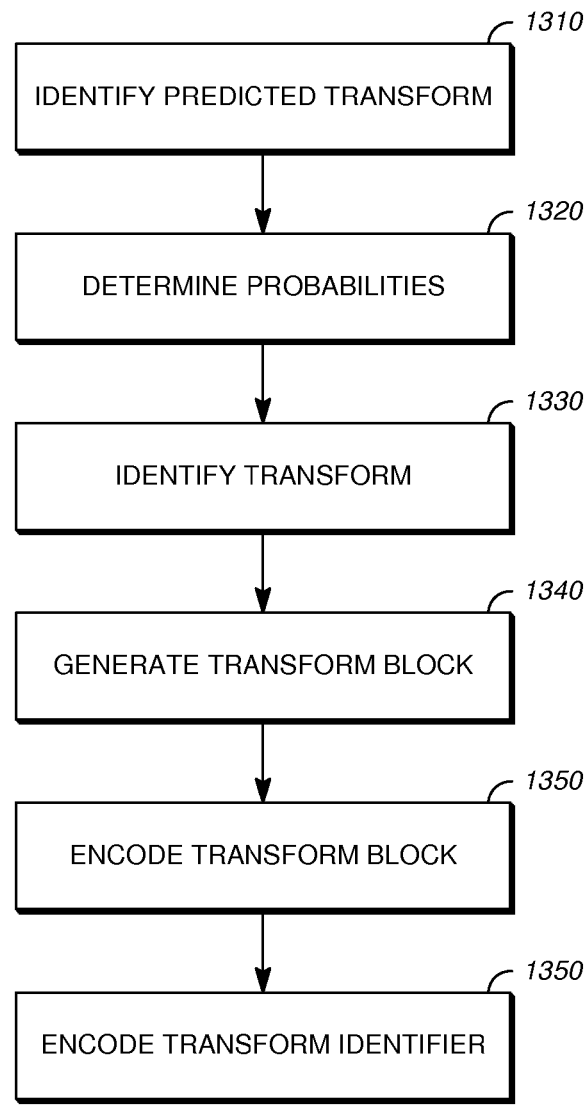
FIG. 13 is a diagram of an example of prediction dependent transform coding including determining entropy coding probabilities in accordance with implementations of this disclosure.

In some implementations, determining the prediction dependent transform (T) may include generating the prediction dependent transform (T) based on the prediction block ($\hat{x}$) as shown in FIG. 9. In some implementations, determining the prediction dependent transform may include identifying a defined transform. In some implementations, determining the prediction dependent transform may include generating transform coefficients (y) by transforming the residual block (r) using the defined transform, and ordering the transform coefficients (y) based on the prediction block ($\hat{x}$) as shown in FIG. 10. In some implementations, determining the prediction dependent transform (T) may include identifying layers from the residual block (r) based on the prediction block ($\hat{x}$), identifying a defined transform for transforming each respective layer, and generating a transform block for each layer using the defined transform identified for the respective layer as shown in FIG. 11. In some implementations, determining the prediction dependent transform (T) may include selecting the defined transform from a set of defined transforms based on the prediction block ($\hat{x}$) as shown in FIG. 12. In some implementations, determining the prediction dependent transform (T) may include identifying a predicted transform based on the prediction block ($\hat{x}$), determining entropy coding probabilities based on the predicted transform, identifying the prediction dependent transform (T), generating transform coefficients by transforming the residual block (r) using the prediction dependent transform (T), and entropy coding the transform coefficients (y) using the determined entropy coding probabilities as shown in FIG. 13.

As used herein, the terminology "defined transform" may include a transform that is available independently of the prediction block ($\hat{x}$), such as a Karhunen-Loève Transform (KLT), a Discrete Cosine Transform (DCT), a Singular Value Decomposition Transform (SVD), or a directional transform. For example, a defined transform may be generated independently from encoding a current block or frame, and may be available at the encoder, the decoder, or both, prior to encoding a current block or a current frame.

In some implementations, the quantization unit 730 may convert the transform coefficients into discrete quantum values, which may be referred to as quantized transform coefficients or quantization levels.

In some implementations, the quantized transform coefficients may be entropy coded. For example, the quantized transform coefficients can be entropy encoded by the entropy encoding unit 740 to generate entropy-encoded coefficients. In some implementations, entropy encoding can include using a probability distribution metric. The compressed bitstream 704 may be generated using techniques, such as run-length encoding (RLE) and zero-run coding. Although not shown separately in FIG. 7, in some implementations, the output bitstream 704 may be transmitted, stored, or stored and transmitted. For example, the output bitstream 704 may be transmitted to a decoder via a wired or wireless medium, such as the wired medium 180C, the wireless medium 180A, or a combination thereof. In another example, the output bitstream may be stored in a storage unit, such as the memory 150 shown in FIG. 1. For simplicity, the description of prediction dependent transform coding herein may omit express recitation of quantization and entropy coding; however, unless otherwise indicated, prediction dependent transform coding may include quantization and entropy coding. For example, generating an encoded block from a transform block may include generating a quantized block by quantizing the transform block and generating an entropy coded block by entropy coding the quantized block.

In some implementations, the entropy-encoded coefficients may be included in an output, compressed, bitstream 704. In some implementations, information that may be used to generate a reconstructed block based corresponding to the input block may be included in the compressed bitstream 704. In some implementations, an identifier that identifies the prediction dependent transform (T) may be included in the output bitstream 704. For example, a predicted transform may be identified based on the prediction block ($\hat{x}$), entropy coding probabilities may be determined based on the predicted transform, a defined transform may be selected as the prediction dependent transform (T) from a set of defined transforms, an identifier that identifies the selected defined transform may be entropy coded using the probabilities determined based on the predicted transform, and the entropy coded identifier may be included in the output bitstream 704. In some implementations, an identifier that identifies the prediction dependent transform (T) may be omitted from the output bitstream 704. For example, the prediction dependent transform (T) may be generated based on the prediction block ($\hat{x}$) or one or more defined transforms may be selected as the prediction dependent transform (T) based on the predicted block ($\hat{x}$), the residual (r) may be transformed using the prediction dependent transform (T), the transform block may be quantized, entropy coded, and included in the output bitstream 704, the output bitstream may be stored or transmitted without including an identifier that identifies the prediction dependent transform (T), and the compressed bitstream 704 may be decoded.

Figure 8:
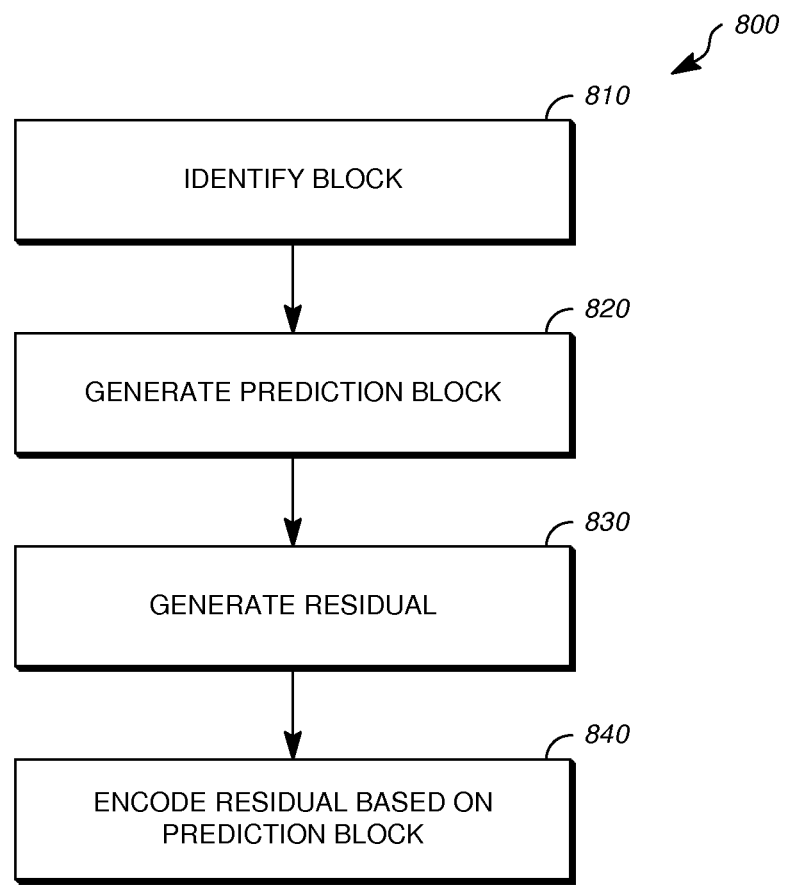
FIG. 8 is a diagram of an example of coding a video stream using prediction dependent transform coding in accordance with implementations of this disclosure.

FIG. 8 is a diagram of an example of coding a video stream using prediction dependent transform coding in accordance with implementations of this disclosure. In some implementations, an encoder, such as the encoder 700 shown in FIG. 7, may receive an input video stream, such as the input video stream 702 shown in FIG. 7, may encode the input video stream, such as the encoding shown in FIG. 7, and may output an encoded video stream, such as the compressed bitstream 704 shown in FIG. 7. In some implementations, encoding the video stream may include prediction dependent transform coding 800. For example, an encoder, such as the encoder 700 shown in FIG. 7, may include a prediction dependent transform unit, such as the prediction dependent transform unit 720, which may generate a transform block based on a source block and a prediction block.

In some implementations, prediction dependent transform coding 800 may include identifying a source block at 810, generating a prediction block at 820, generating a residual block at 830, encoding the residual block based on the prediction block at 840, or a combination thereof.

In some implementations, a source block may be identified at 810. In some implementations, a current frame of the input, or source, video stream may include multiple N×N blocks, such as 16×16 blocks, and a block from the source frame may be identified as the source block. In some implementations, each block from the source frame may be coded on a block-by-block basis. In some implementations, block based coding may include encoding a block using hierarchical coding, such as quad-tree coding. For example, the current block may be a 64×64 block, and encoding the current block may include encoding one or more sub-blocks, such as one or more of the blocks 610-650 shown in FIG. 6.

In some implementations, a prediction block may be generated at 820. For example, a prediction unit, such as the intra/inter prediction unit 710 shown in FIG. 7, may generate the prediction block. In some implementations, the prediction block may be generated based on a reference frame, or a combination of reference frames, using inter-prediction. For example, generating the prediction block may include identifying a motion vector that indicates a spatial difference between a location of the input block in the current frame and a location of a best matching block in a reference frame, and the prediction block may be the best matching block from the reference frame.

In some implementations, a residual block may be generated at 830. For example, a residual unit, such as the residual unit 715 shown in FIG. 7, may generate the residual block. In some implementations, the residual block may be generated based on a difference between the prediction block and the current input block. In some implementations, the residual block may be generated during prediction, such as the inter-prediction 410 shown in FIG. 4.

In some implementations, the residual block may be encoded based on the prediction block at 840. In some implementations, encoding the residual block based on the prediction block may include determining a prediction dependent transform based on the prediction block. For example, encoding the residual block based on the prediction block may include generating a prediction dependent transform, ordering transform coefficients, generating layers, selecting a defined transform as the prediction dependent transform, determining entropy coding probabilities, or a combination thereof. In some implementations, encoding the residual block may include identifying edge information from the prediction block. In some implementations, encoding the residual block based on the prediction block may include generating a transform block by transforming the residual block using the prediction dependent transform.

In some implementations, determining the prediction dependent transform may include determining a prediction dependent transform mode, such as a generate mode, an ordered mode, a layered mode, a select mode, an express mode, or a combination thereof. For example, the prediction dependent transform mode may be identified as generate mode and determining the prediction dependent transform may include generating the prediction dependent transform based on the prediction block. In another example, the prediction dependent transform mode may be identified as ordered mode and determining the prediction dependent transform may include ordering transform coefficients based on the prediction block. In another example, the prediction dependent transform mode may be identified as layered mode and determining the prediction dependent transform may include generating layers based on the prediction block. In another example, the prediction dependent transform mode may be identified as select mode and determining the prediction dependent transform may include selecting a defined transform based on the prediction block. In another example, the prediction dependent transform mode may be identified as express mode and determining the prediction dependent transform may include determining entropy encoding probabilities based on the prediction block. In some implementations, two or more of the prediction dependent transform modes may be combined.

Although not shown separately in FIG. 8, in some implementations, encoding the residual block at 840 may include quantization, such as the quantization 730 shown in FIG. 7, entropy coding, such as the entropy coding 740 shown in FIG. 7, or both. Although not shown separately in FIG. 8, in some implementations, the encoded block may be included in an output bitstream, such as the compressed bitstream 704 shown in FIG. 7. In some implementations, the output bitstream may be transmitted or stored. For example, the output bitstream may be transmitted via a wired or wireless medium to a decoder. In another example, the output bitstream may be stored in a storage unit, such as the memory 150 shown in FIG. 1.

Figure 9A:
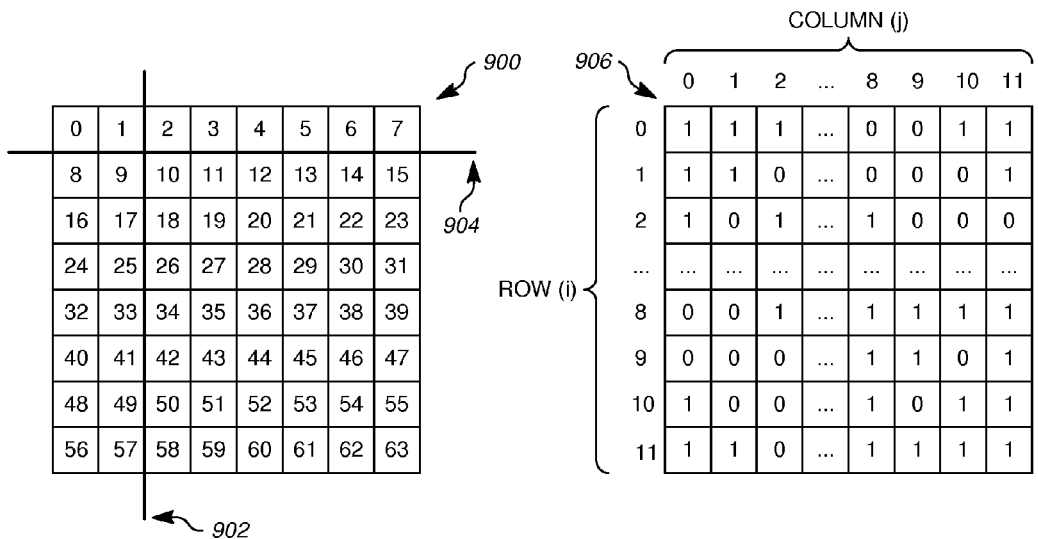
FIGS. 9A and 9B show an example of prediction dependent transform coding including generating a prediction dependent transform in accordance with implementations of this disclosure.
Figure 9B:
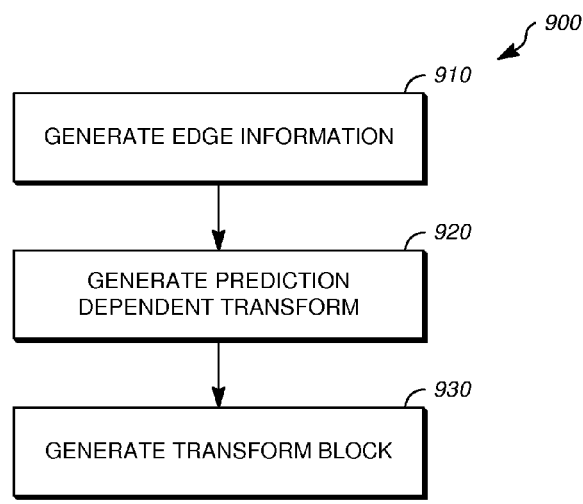

FIGS. 9A and 9B show an example of prediction dependent transform coding including generating a prediction dependent transform in accordance with implementations of this disclosure. In some implementations, prediction dependent transform coding including generating a prediction dependent transform as shown in FIG. 9B may include generating an edge information block as shown in FIG. 9A.

FIG. 9A is a diagram of an example of generating an edge information block in accordance with implementations of this disclosure. The example shown in FIG. 9A includes a prediction block 900, a first edge 902, a second edge 904, and a portion of an edge information block 906. In some implementations, an edge information block may indicate a metric, degree, or quantification, of similarity between neighboring pixels, such as immediately adjacent pixels.

In some implementations, a prediction block may include M pixels. For example, the prediction block may be an N×N block of pixels, such as the 8×8 block 900 shown, and the prediction block may include M=N*N pixels, such as the 64 pixel (M=64) block 900 shown. Although prediction dependent transform coding is described with reference to an 8×8 prediction block herein, any size prediction block may be used, such as the square blocks 610-650 shown in FIG. 6, or other rectangular blocks. In some implementations, each pixel in the prediction block may be identified by an index value in a scan order, such as raster scan order as shown. Although not shown block 900 of FIG. 9A, in some implementations, a pixel, or a location of a pixel, may be identified using Cartesian or matrix coordinates, which may include a row identifier (i) and a column identifier (j). For example, the top left pixel in the N×N (N=8) prediction block may be identified by the index value zero (0) or the coordinates (0,0) for the first row (i=0) and first column (j=0), and the bottom right pixel in the prediction block may be identified by the index value 63 or the coordinates (7,7) for the eight row (i=7) and the eight column (j=7).

In some implementations, an edge may be detected such that immediately adjacent, or neighboring, pixels are on either side of the edge. For example, the pixels in the second column of the prediction block are on the left side of the first edge 902 and the pixels in the third column of the prediction block are on the right side of the first edge 902. Similarly, the pixels in the first row of the prediction block are on the top side of the second edge 904 and the pixels in the second row of the prediction block are on the bottom side of the second edge 904.

In some implementations, the edge information block may be an M×M matrix or block. For example, an edge information block generated based on the N×N (N=8) prediction block 900 may be an M×M (M=64) block. In FIG. 9A, a portion of an edge information block 906 is shown for simplicity. In some implementations, a matrix, or Cartesian, location G(i,j) in the edge information block G (row i, column j) 906, may indicate an edge weight between a pixel from the prediction block at index i and a pixel from the prediction block at index j. For example, the location in the graph matrix G(0,1) may indicate an edge weight between the pixel at index 0, which may be the pixel in the first row and first column of the prediction block 900, and the pixel at index 1, which may be the pixel in the first row and second column of the prediction block 900.

In an example, two pixels (pixel i and pixel j) from the prediction block 900 may be immediately adjacent, the edge detection may indicate that the first pixel (i) is on one side of an edge and the second pixel (j) is on the other side of the edge, and the value of G(i,j) may be zero (0), which may be expressed as G(i,j)=0. In another example, the two pixels (pixel i and pixel j) from the prediction block 900 may be immediately adjacent, the edge detection may indicate that the first pixel (i) and the second pixel (j) are not on opposite sides of an edge, and the value of G(i,j) may be zero (0), which may be expressed as G(i,j)=1. In some implementations, a location in the edge information block 906 may indicate a single pixel, such as G(0,0), or may indicate pixels that are not immediately adjacent, such as G(0,4), and the value for the location may be zero (0).

FIG. 9B is a diagram of an example of prediction dependent transform coding including generating a prediction dependent transform in accordance with implementations of this disclosure. For example, the coder 700 shown in FIG. 7 may implement prediction dependent transform coding 800 as shown in FIG. 8, which may include generating a prediction dependent transform as shown in FIG. 9B. In some implementations, the prediction dependent transform may be a graph based transform. In some implementations, prediction dependent transform coding may include generating a prediction dependent transform based on the prediction block. For example, a transform unit, such as the prediction dependent transform unit 720 shown in FIG. 7, may generate the prediction dependent transform based on the prediction block. In some implementations, generating a prediction dependent transform based on the prediction block may include generating edge information at 910, generating the prediction dependent transform at 920, generating a transform block at 930, or a combination thereof.

In some implementations, the edge information may be generated from the prediction block at 910. In some implementations, generating the edge information may include generating an edge information block, such as the edge information block 906 shown in FIG. 9A, based on a prediction block, such as the prediction block 900 shown in FIG. 9A. In some implementations, generating the edge information block may include detecting edges in the prediction block. For example, the edges may be detected using an edge detection kernel. In some implementations, generating the edge information may include extracting a graph based on a measure of similarity between a pixel and neighboring pixels.

In some implementations, generating the edge information block may include identifying a first pixel and a second pixel from the prediction block. For example, the first pixel may be identified as the pixel represented at index 1 in the prediction block 900 shown in FIG. 9A, and the second pixel may be identified as the pixel represented at index 2 in the prediction block 900 shown in FIG. 9A. In some implementations, generating the edge information block may include identifying a location in the edge information block corresponding to the identified pixels. For example, the location at row 1 and column 2 in the edge information block may correspond with the pixels at index 1 and index 2 in the prediction block. In some implementations, generating the edge information block may include determining a value for the identified location. For example, the pixel at index 1 and the pixel at index 2 may be adjacent in the prediction block, an edge may be detected between the pixels, and the value of the location, or locations, corresponding to the edge between the pixels may be 0. In another example, the pixel at index 3 and the pixel at index 4 may be adjacent in the prediction block, no edge may be detected between the pixels, and the value of the corresponding location, or locations, between the pixels may be 1.

In some implementations, the prediction dependent transform may be generated based on information from the prediction block, such as edge information, at 920. For example, the prediction dependent transform may be generated based on the edge information block generated at 910. In some implementations, a diagonal matrix D may be an M×M diagonal matrix and D(i,i) may be the sum of the ith row of the edge information block G. In some implementations, a diagonal matrix A may be based on L. For example, the diagonal matrix A may include the Eigenvalues of L. In some implementations, a positive semi-definite matrix L may represent a difference between the diagonal matrix D and the edge information block G, which may be expressed as L=D−G. In some implementations, the matrix L may be decomposed using a matrix U, which may be an Eigen-matrix, which may be expressed as L=U*A*U'. In some implementations, the matrix U may be used as the prediction dependent transform.

In some implementations, a transform block may be generated by transforming the residual block using the prediction dependent transform at 930. In some implementations, generating the transform block at 950 may include processing the pixels from the residual block in a scan order, such as raster scan order. For example, the residual block may be converted to a residual vector V. In some implementations, generating the transform block s at 930 may include projecting the ordered residual pixels, such as the pixels from vector V, into the spectral domain, which may be expressed as s=v*U.

FIGS. 10A and 10B show an example of prediction dependent transform coding including ordering transform coefficients in accordance with implementations of this disclosure. In some implementations, prediction dependent transform coding including ordering transform coefficients as shown in FIG. 10B may include identifying a scan order as shown in FIG. 10A.

FIG. 10A is a diagram of an example of ordering transform coefficients in accordance with implementations of this disclosure. For simplicity, FIG. 10A shows 4×4 blocks; however, any size blocks may be used, such as the blocks 610-650 shown in FIG. 6, or other rectangular blocks. FIG. 10A shows an example of a 4×4 portion of a residual transform block 1000, an example of a corresponding portion of an edge information block 1002, an example of a corresponding portion of a zig-zag scan order 1004, an example of a corresponding portion of an edge transform block 1006, and an example of a corresponding portion of a scan order 1008.

In some implementations, the edge information block 1002 may include edge information for each pixel from the prediction block. In some implementations, the prediction block may be a N×N block and may include M pixels (M=N*N), and the edge information block may be an M×M block, such as the edge information block 906 shown in FIG. 9A, or the edge information block may be an N×N block, such as the edge information block 1002 shown in FIG. 10A. For example, the edge information may include a soft metric, which may be a value in a defined range, such as zero to 255 ([0-255]), wherein a low value may indicate that the pixel is in a smooth area of the frame, such as an area that is not near an edge, and a high value may indicate that a pixel is near an edge, as shown.

FIG. 10B is a diagram of an example of prediction dependent transform coding including ordering transform coefficients in accordance with implementations of this disclosure. For example, the coder 700 shown in FIG. 7 may implement prediction dependent transform coding 800 as shown in FIG. 8, which may include ordering transform coefficients as shown in FIG. 10B. In some implementations, prediction dependent transform coding may include generating transform coefficients by transforming the residual block using a defined transform, and ordering the transform coefficients based on the prediction block. In some implementations, prediction dependent transform coding including ordering transform coefficients may include generating edge information at 1010, generating a residual transform block at 1020, generating an edge transform block at 1030, ordering the edge transform block at 1040, ordering the residual transform block at 1050, or a combination thereof.

In some implementations, edge information may be generated at 1010. For example, the edge information may be generated from the prediction block. In some implementations, generating the edge information may include generating an edge information block, or matrix, such as the edge information block 1002 shown in FIG. 10A. In some implementations, generating the edge information block may include detecting edges in the prediction block. For example, the edges may be detected using an edge detection kernel. In some implementations, the edge information may include edge information for each pixel from the prediction block. For example, the edge information may include a soft metric, which may be a value in a defined range, such as zero to 255 ([0-255]), wherein a low value may indicate that the pixel is in a smooth area of the frame, such as an area that is not near an edge, and a high value may indicate that a pixel is near an edge, as shown. In some implementations, the prediction block may be a N×N block and the edge information block may be an N×N block.

In some implementations, a residual transform block may be generated at 1020. For example, the residual transform block, such as the residual transform block 1000 shown in FIG. 10A, may be generated by transforming the residual block using a defined transform, such as a DCT.

In some implementations, an edge transform block may be generated at 1030. For example, an edge transform block, such as the edge transform block 1006 shown in FIG. 10A, may be generated by transforming the edge information block using the transform used to generate the residual transform block. For example, the residual transform block may be generated using a DCT and the edge transform block may be generated using the DCT.

In some implementations, an order from the edge transform block may be identified at 1040. For example, the edge transform block may include coefficients, and the order may be identified based on the magnitude of the coefficients. In some implementations, identifying the order may include arranging the coefficients in descending order of magnitude. For example, identifying the order may include generating a matrix identifying a scan order, such as the scan order matrix

1008 shown in FIG. 10A. In some implementations, the magnitudes of two or more coefficients may be equal and the coefficients may be ordered based on a defined scan order, such as the zig-zag scan order 1004 shown in FIG. 10A. For example, as shown in the example shown in FIG. 10, the zero (0) magnitude edge transform coefficients are ordered according to the zig-zag scan order.

In some implementations, the residual transform block may be ordered at 1050. For example, the coefficients from the residual transform block generated at 1020 may be entropy coded in the order indicated by the scan order identified at 1040.

FIGS. 11A and 11B are diagrams of an example of prediction dependent transform coding including coding layers in accordance with implementations of this disclosure. In some implementations, coding layers, as shown in FIG. 11B, may include identifying layers, as shown in FIG. 11A.

FIG. 11A is a diagram of an example of coding layers in accordance with implementations of this disclosure. For simplicity, FIG. 11A shows 4×4 blocks; however, any size blocks may be used, such as the blocks 610-650 shown in FIG. 6, or other rectangular blocks. FIG. 11A shows an example of a 4×4 portion of a residual block 1100, an example of a corresponding portion of an edge information block 1102, an example of a corresponding portion of a layer mask 1104, an example of a corresponding portion of a first layer 1106, and an example of a corresponding portion of second layer 1108.

FIG. 11B is a diagram of an example of prediction dependent transform coding including coding layers in accordance with implementations of this disclosure. For example, the coder 700 shown in FIG. 7 may implement prediction dependent transform coding 800 as shown in FIG. 8, which may include generating layers as shown in FIG. 11B. In some implementations, prediction dependent transform coding including coding layers may include generating edge information at 1110, identifying layers at 1120, generating layer transform blocks at 1130, or a combination thereof.

In some implementations, edge information may be generated at 1110. For example, the edge information may be generated from the prediction block. In some implementations, generating the edge information may include generating an edge information block, or matrix, such as the edge information block 1102. In some implementations, generating the edge information block may include detecting edges in the prediction block. For example, the edges may be detected using an edge detection kernel. In some implementations, the edge information may include edge information for each pixel from the prediction block. For example, the edge information may include a soft metric, which may be a value in a defined range, such as zero to 255 ([0-255]), wherein a low value may indicate that the pixel is in a smooth area of the frame, such as an area that is not near an edge, and a high value may indicate that a pixel is near an edge, as shown. In some implementations, the prediction block may be a N×N block and the edge information block may be an N×N block.

In some implementations, layers may be identified at 1120. In some implementations, the layers may be identified based on the prediction block. For example, the layers may be identified based on the edge information identified from the prediction block. In some implementations, identifying layers may include identifying a number, count, or cardinality of layers. For simplicity, prediction dependent transform coding is described herein with reference to identifying two layers; however, any number of layers may be used.

In some implementations, identifying the layers may include identifying a coefficient magnitude range, or band, for each layer. For example, the edge information block may include coefficient that may have magnitudes in the range from zero (0) to 255, a First Layer, which may be associated with low energy edge coefficients, may have a range from zero (0) to 199, and a second layer, which may be associated with high energy edge coefficients, may have a range from 200 to 255. In some implementations, identifying the layers may include identifying a layer for each coefficient from the edge information block based on the magnitude range associated with the respective layers. For example, the residual block may include N pixels, the edge information block may include N coefficients, the magnitude of M, which may be less than N, of the N coefficients may be in the range associated with the first layer, and N-M of the coefficients may be in the range associated with the second layer. In the example shown in FIG. 11A, the eight coefficients in the left two columns are in the range [0-199] associated with the first layer, and the eight coefficients in the right two columns are in the range [200-255] associated with the second layer.

In some implementations, the values of pixels from the residual block may be included in a layer based on the edge information. For example, the values of pixels from the residual block that correspond spatially with locations from the edge information that are identified as being associated with the first layer may be included in the first layer, and the values of pixels from the residual block that correspond spatially with locations from the edge information that are identified as being associated with another layer, such as the second layer, may be omitted from the first layer. Similarly, the values of pixels from the residual block that correspond spatially with locations from the edge information that are identified as being associated with the second layer may be included in the second layer, and the values of pixels from the residual block that correspond spatially with locations from the edge information that are identified as being associated with another layer, such as the first layer, may be omitted from the second layer. As shown in FIG. 11A, the values of the pixels from the left two columns of the residual block 1100 may be included in the first layer and the values of the pixels from the right two columns of the residual block 1100 may be included in the second layer.

In some implementations, layer transform blocks may be generated at 1130. In some implementations, generating the layer transform blocks may include transforming each layer using a shape adaptive transform.

In some implementations, generating the layer transform blocks may include generating a layer mask, such as the layer mask 1104 shown in FIG. 11A, for each layer. For example, the layer mask 1104 shown in FIG. 11A may be associated with the first layer, the zero (0) value coefficients may indicate the location of coefficients from the edge information block that are within the range associated with the first layer, and the one (1) value coefficients may indicate the location of coefficients from the edge information block that are outside the range associated with the first layer. In some implementations, a layer mask may indicate the spatial location of pixels from the residual block corresponding to the respective layers. For example, pixel values from the residual block at locations corresponding to zero (0) value coefficients in the layer mask may be included in the layer.

In some implementations, identifying the layers may include determining an average of the values of the pixels from the residual block included in the each respective layer.

For example, as shown in FIG. 11A, the first layer may include the left two columns of the residual block 1100, and the average, rounding up for simplicity, may be 27. Similarly, the second layer may include the right two columns of the residual block 1100, and the average, rounding up for simplicity, may be 39. In some implementations, an average of the pixel values omitted from a layer may be included in the layer as the value for each omitted location. For example, the first layer 1106 shown in FIG. 11A includes the pixel values from the left two columns of the residual block 1100, and includes the average (39) of the values omitted from the first layer for each location from the residual block 1100 omitted from the first layer 1106. Similarly, the second layer 1108 shown in FIG. 11A includes the pixel values from the right two columns of the residual block 1100, and includes an average (27) of the values omitted from the second layer for each location from the residual block 1100 omitted from the second layer 1108.

In some implementations, a transform may be identified for the first layer and a first layer transform block may be generated by transforming the first layer using the identified transform. In some implementations, the first layer transform block may represented in the output bitstream using a single bit, which may indicate that the coefficients of the first layer are zero. For example, the first layer transform block may be quantized, the quantized coefficients may be zero value quantized coefficients, and the first layer may be represented in the output bitstream using a single bit.

In some implementations, a transform may be identified for the second layer and a second layer transform block may be generated by transforming the second layer using the transform identified for the second layer. In some implementations, the transform identified for the second layer may differ from the transform identified for the first layer. In some implementations, the second layer transform block may be included in the output bitstream. For example, the second layer transform block may be quantized, the quantized second layer transform block may be entropy coded, and the entropy coded quantized second layer transform block may be included in the output bitstream.

FIG. 12 is a diagram of an example of prediction dependent transform coding including identifying a defined transform from a set of defined transforms in accordance with implementations of this disclosure. For example, the coder 700 shown in FIG. 7 may implement prediction dependent transform coding 800 as shown in FIG. 8, which may include selecting a defined transform as shown in FIG. 12. In some implementations, prediction dependent transform coding may include selecting a defined transform from a set of defined transforms based on the prediction block at 1210, generating a transform block at 1220, encoding the transform block at 1230, or a combination thereof.

In some implementations, a defined transform may be identified from a set of defined transforms based on the prediction block at 1210. For example, the set of defined transforms may include a DCT and one or more directional transforms. For example the set of defined transforms may include 16 candidate transforms. In some implementations, information indicating the set of defined transforms may be available at the encoder, the decoder, or both, prior to encoding the current frame. In some implementations, the selected defined transform may be identified from the set of defined transforms based on the prediction block. In some implementations, a transform block may be generated at 1220. For example, the residual block may be transformed using the selected defined transform to generate the transform block. In some implementations, the transform block may be encoded at 1230. For example, the transform block may be quantized to generate a quantized block, the quantized block may be entropy coded to generate an entropy coded block, and the entropy coded block may be included in the output bitstream.

FIG. 13 is a diagram of an example of prediction dependent transform coding including determining entropy coding probabilities in accordance with implementations of this disclosure. For example, the coder 700 shown in FIG. 7 may implement prediction dependent transform coding 800 as shown in FIG. 8, which may include determining entropy coding probabilities as shown in FIG. 13. In some implementations, prediction dependent transform coding may include identifying a predicted transform based on the prediction block at 1310, determining entropy coding probabilities based on the predicted transform at 1320, identifying a selected transform at 1330, generating at transform block using the selected transform at 1340, encoding the transform block using the probabilities at 1350, encoding a transform identifier at 1360, or a combination thereof.

In some implementations, a predicted transform may be identified based on the prediction block at 1310. For example, the predicted transform may be identified, based on the prediction block, from a set of defined transforms.

In some implementations, entropy coding probabilities may be determined at 1320. For example, the entropy coding probabilities may be determined based on the predicted transform.

In some implementations, a defined transform may be identified at 1330. For example, the defined transform may be selected from the set of defined transforms. In some implementations, the defined transform may be selected based on the residual block. For example, a candidate transform block may be generated using each defined transform from the set of defined transforms and the defined transform that generated the most efficient transform block may be selected as the defined transform for encoding the current block. In some implementations, the predicted transform may be the selected defined transform or may differ from the selected defined transform.

In some implementations, a transform block may be generated at 1340. For example, the transform block may be generated by transforming the residual block using the defined transform selected at 1330.

In some implementations, the transform block may be encoded at 1350. For example, the transform block may be quantized to generate a quantized block, and the quantized block may be entropy coding using the probabilities determined based on the predicted transform at 1320.

In some implementations, a transform identifier may be encoded at 1360. In some implementations, an identifier that identifies the defined transform selected at 1330 may be encoded using the probabilities determined at 1320 based on the predicted transform identified at 1310. For example, the set of defined transforms may be indexed such that each defined transform may be associated with an index value that uniquely identifies the defined transform, the index value may be entropy coded using the probabilities determined at 1320, and the entropy coded transform identifier may be included in the output bitstream.

Figure 14:
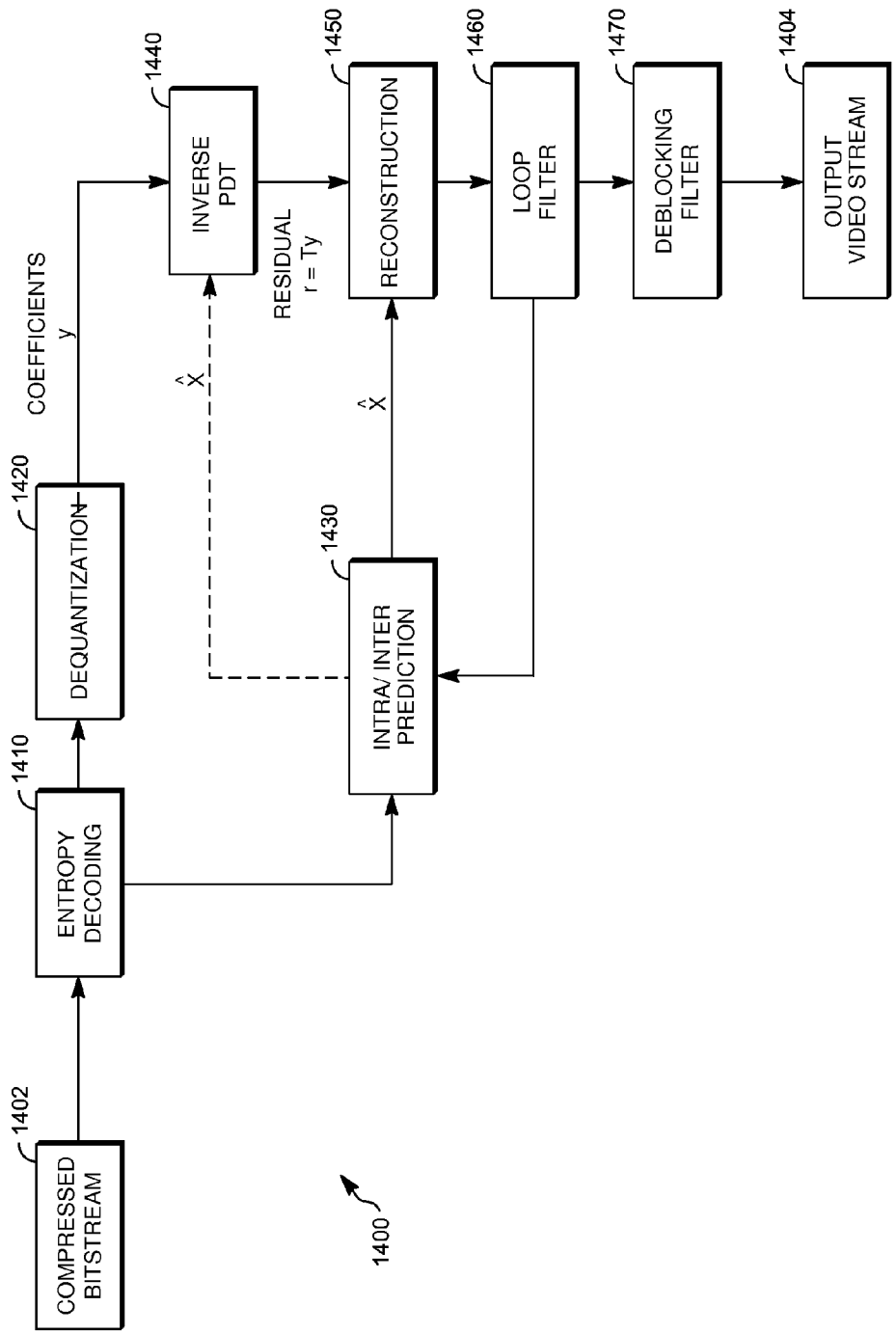
FIG. 14 is a block diagram of a decoder implementing prediction dependent transform coding in accordance with implementations of this disclosure.

FIG. 14 is a block diagram of a decoder 1400 implementing prediction dependent transform coding in accordance with implementations of this disclosure. The decoder 1400 may be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to encode video data using prediction dependent transform coding. The decoder 1400 can be implemented as specialized hardware included, for example, in computing device 100.

In some implementations, the decoder 1400 may decode a compressed bitstream 1402, such as the compressed bitstream 704 shown in FIG. 7, using prediction dependent transform coding, to generate a decoded (reconstructed) bitstream 1404. In some implementations, the decoder 1400 may include an entropy decoding unit 1410, a dequantization unit 1420, an intra/inter prediction unit 1430, an inverse prediction dependent transform unit 1440, a reconstruction unit 1450, a loop filtering unit 1460, a deblocking filtering unit 1470, or any combination thereof. Other structural variations of the decoder 1400 can be used to decode the compressed bitstream 1402.

The entropy decoding unit 1410 may decode data elements within the compressed bitstream 1402 using, for example, Context Adaptive Binary Arithmetic Decoding, to produce a set of quantized transform coefficients. In some implementations, the compressed bitstream 1402 may omit information expressly identifying the transform used for generating the transform coefficients. In some implementations, the dequantization unit 1420 may convert the quantized transform coefficients, which may be discrete quantum values, into transform coefficients y.

In some implementations, the intra/inter prediction unit 1430 may generate a prediction block ($\hat{x}$), which may correspond to the prediction block created in the encoder. For example, the prediction block ($\hat{x}$) may be generated based on a previously decoded reference frame and header information decoded from the compressed bitstream 1402, which may include motion vectors.

In some implementations, the inverse prediction dependent transform unit 1440 may inverse transform the dequantized transform coefficients (y) based on the prediction block ($\hat{x}$) to produce a derivative residual block (r), which may correspond with a derivative residual block generated by the return path (not shown) of the encoder 700 shown in FIG. 7. In some implementations, the inverse prediction dependent transform unit 1440 may generate the derivative residual block (r) based on the dequantized coefficients (y) and the prediction block ($\hat{x}$). For example, the inverse prediction dependent transform unit 1440 may perform an inverse block-based transform, which may include inverse-transforming the dequantized transform coefficients (y) from the frequency domain, to the pixel domain. In some implementations, a derivative residual pixel value (r) may be generated as a function of the inverse prediction dependent transform (T) and the transform coefficient (y), which may be expressed as $r=Ty$.

In some implementations, inverse prediction dependent transform unit 1440 may determine an inverse prediction dependent transform (T) based on the prediction block ($\hat{x}$). In some implementations, the inverse prediction dependent transform unit 1440 may identify edge information from the prediction block. For example, the edge information may include an edge information block, matrix, or graph, which may be referred to as a similarity matrix or graph. In some implementations, the edge information generated by the decoder may correspond to the edge information generated by the encoder. Although not shown separately in FIG. 14, in some implementations, the decoder may include an edge detection unit, and the inverse prediction dependent transform unit 1440 may receive the edge information from the edge detection unit.

In some implementations, determining the inverse prediction dependent transform may include generating the inverse prediction dependent transform based on the prediction block ($\hat{x}$), which may be similar to the prediction dependent transform generation shown in FIG. 9. For example, the inverse prediction dependent transform unit 1440 may generate edge information from the prediction block ($\hat{x}$), generate an inverse prediction dependent transform based on the edge information, and may generate the residual block by inverse prediction dependent transforming the dequantized coefficients using the inverse prediction dependent transform.

In some implementations, determining the inverse prediction dependent transform may include generating the residual block (r) by identifying a defined transform, ordering the dequantized transform coefficients based on the prediction block ($\hat{x}$), and inverse transforming the ordered transform coefficients using the defined transform, which may be similar to the prediction dependent transform coding shown in FIG. 10.

In some implementations, determining the inverse prediction dependent transform may include entropy decoding two or more layers, dequantizing each layer, identifying a defined transform for transforming each respective layer, generating a partial derivative residual block for each layer by inverse transforming the respective layer using the respective identified defined transform, and combining the partial derivative residual blocks to generate a derivative residual block, which may be similar to the prediction dependent transform coding shown in FIG. 11. For example, each pixel value in the derivative residual block may be selected from the first partial derivative residual block or the second partial derivative residual block based on the edge information generated for the prediction block.

In some implementations, determining the inverse prediction dependent transform may include selecting the defined transform from a set of defined transforms based on the prediction block ($\hat{x}$), which may be similar to the prediction dependent transform coding shown in FIG. 12.

In some implementations, determining the inverse prediction dependent transform may include identifying a predicted transform based on the prediction block, determining entropy decoding probabilities based on the predicted transform, entropy decoding the transform coefficients using the determined entropy coding probabilities, identifying the inverse prediction dependent transform, and generating the residual block (r) by inverse transforming the dequantized transform coefficients using the inverse prediction dependent transform, which may be similar to the prediction dependent transform coding shown in FIG. 13. For example, the predicted transform may be identified based on edge information generated for the prediction block.

In some implementations, the reconstruction unit 1450 may add the prediction block ($\hat{x}$) to the derivative residual block (r) to create a reconstructed block. The loop filtering unit 1460 can be applied to the reconstructed block (r) to reduce blocking artifacts. The deblocking filtering unit 1470 can be applied to reduce blocking distortion, and the result may be output as the output video stream 1404.

Other variations of the decoder 1400 can be used to decode the compressed bitstream 1402. For example, the deblocking filtering unit 1470 may be omitted.

Figure 15:
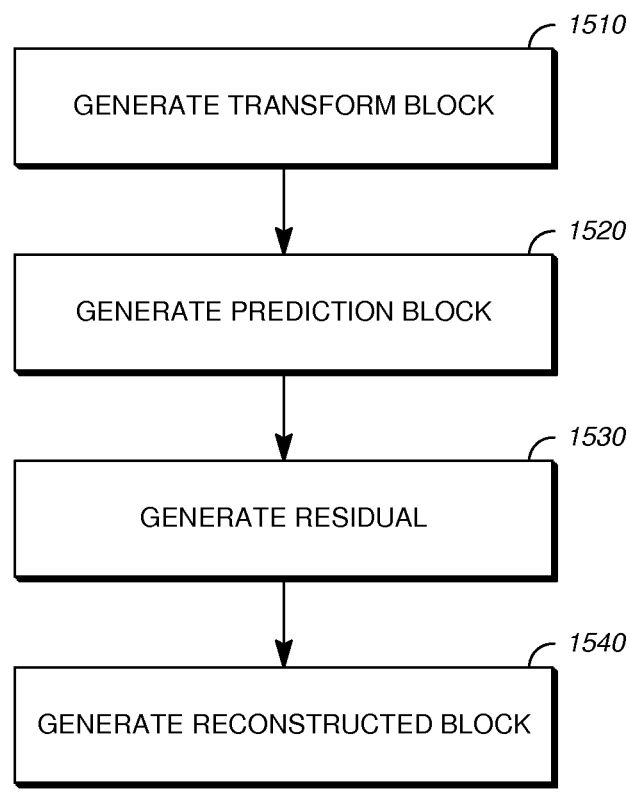
FIG. 15 is a diagram of an example of decoding a video stream using prediction dependent transform coding, in accordance with implementations of this disclosure.

FIG. 15 is a diagram of an example of decoding a video stream using prediction dependent transform coding, in accordance with implementations of this disclosure. In some implementations, a decoder, such as the decoder 1400 shown in FIG. 14, may receive a compressed video stream, such as the compressed bitstream 704 shown in FIG. 7, may decode the compressed bitstream, and may output a reconstructed video stream, such as the output video stream 1404 shown in FIG. 14. In some implementations, decoding the compressed bitstream may include prediction dependent transform coding 1500. For example, a decoder, such as the decoder 1400 shown in FIG. 14, may include an inverse prediction dependent transform unit, such as the inverse prediction dependent transform unit 1440, which may generate a derivative residual block based on a prediction block and decoded transform coefficients.

In some implementations, prediction dependent transform coding 1500 may include identifying a transform block at 1510, generating a prediction block at 1520, decoding a residual block based on the prediction block at 1530, generating a reconstructed block at 1540, or a combination thereof.

In some implementations, a transform block may be identified at 1510. In some implementations, an entropy coded block may be extracted from the compressed bitstream, the entropy coded block may be entropy decoded to generate a quantized transform block, and the quantized transform block may be dequantized to generate the transform block. For example, an entropy decoding unit, such as the entropy decoding unit 1410 shown in FIG. 14, may generate the quantized transform block, and a dequantization unit, such as the dequantization unit 1420 shown in FIG. 14, may generate the transform block.

In some implementations, a prediction block may be generated at 1520. For example, an intra/inter prediction unit, such as the intra/inter prediction unit 1430 shown in FIG. 14, may generate the prediction block based on information decoded from the compressed bitstream and a previously reconstructed frame.

In some implementations, a derivative residual block may be generated based on the prediction block at 1530. For example, generating the residual block based on the prediction block may include generating a prediction dependent transform (PDT), ordering transform coefficients, generating layers, selecting a defined transform as the PDT, determining entropy coding probabilities, or a combination thereof. In some implementations, generating the residual block based on the prediction block may include generating the residual block by inverse transforming the transform block using the prediction dependent transform. In some implementations, generating the residual block may include identifying edge information from the prediction block.

In some implementations, a reconstructed block may be generated at 1540. For example, the derivative residual block may be combined with the prediction block to generate the reconstructed block. Although not shown separately in FIG. 15, the reconstructed block may be filtered. For example, a loop filtering unit, such as the loop filtering unit 1460 shown in FIG. 14 may loop filter the reconstructed block. In another example, a deblocking filtering unit, such as the deblocking filtering unit 1470 shown in FIG. 14 may deblock the reconstructed block.

Other implementations of the diagrams of prediction dependent transform coding as shown in FIGS. 7-15 are available. In implementations, additional elements of prediction dependent transform coding can be added, certain elements can be combined, and/or certain elements can be removed.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, not all elements of the methods described herein may be required to implement a method in accordance with the disclosed subject matter.

The implementations of the transmitting station 100A and/or the receiving station 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 100A and the receiving station 100B do not necessarily have to be implemented in the same manner.

Further, in one implementation, for example, the transmitting station 100A or the receiving station 100B can be implemented using a general purpose computer or general purpose/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

The transmitting station 100A and receiving station 100B can, for example, be implemented on computers in a real-time video system. Alternatively, the transmitting station 100A can be implemented on a server and the receiving station 100B can be implemented on a device separate from the server, such as a hand-held communications device. In this instance, the transmitting station 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 100A. Other suitable transmitting station 100A and receiving station 100B implementation schemes are available. For example, the receiving station 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method comprising:
    identifying a current input block from a current input frame from an input video stream;
    generating a prediction block for the current input block;
    generating a residual block based on a difference between the current input block and the prediction block;
    generating, by a processor in response to instructions stored on a non-transitory computer readable medium, an encoded block by encoding the residual block based on the prediction block using a prediction dependent transform coding;
    including the encoded block in an output bitstream; and
    outputting or storing the output bitstream.

2. The method of claim 1, wherein encoding the residual block using a prediction dependent transform coding includes:
    determining a prediction dependent transform based on the prediction block;
    generating a residual transform block by transforming the residual block using the prediction dependent transform; and
    generating the encoded block by encoding the residual transform block.

3. The method of claim 2, wherein encoding the residual block using the prediction dependent transform coding includes generating the encoded block such that the encoded block is decodable based on the prediction block on a condition that the output bitstream omits an identifier that identifies the prediction dependent transform.

4. The method of claim 2, wherein determining the prediction dependent transform includes generating an edge information block based on the prediction block.

5. The method of claim 4, wherein generating the edge information block includes:
    identifying an edge in the prediction block;
    identifying a first pixel from the prediction block;
    identifying a second pixel from the prediction block;
    identifying a location in the edge information block, the location corresponding to an index of the first pixel in the prediction block and an index of the second pixel in the prediction block, wherein the first pixel is immediately adjacent to the second pixel in the prediction block; and
    determining a value for the location, the value indicating whether the first pixel is on a first side of the edge and the second pixel is on a second side of the edge.

6. The method of claim 4, wherein determining the prediction dependent transform includes generating the prediction dependent transform based on the edge information block.

7. The method of claim 6, wherein generating the prediction dependent transform based on the edge information block includes identifying, as the prediction dependent transform, a matrix that can decompose a difference between a diagonal matrix and the edge information block, wherein each element of the diagonal matrix is a sum of a corresponding row of the edge information block.

8. The method of claim 4, wherein determining the prediction dependent transform includes identifying a defined transform as the prediction dependent transform.

9. The method of claim 8, wherein the defined transform is a discrete cosine transform.

10. The method of claim 8, wherein encoding the residual block using the prediction dependent transform coding includes:
    generating an edge information transform block by transforming the edge information block using the defined transform, wherein the edge information transform block includes a plurality of edge information transform coefficients in a first order;
    identifying a scan order indicating a second order of the plurality of edge information transform coefficients in descending order of magnitude; and
    entropy coding the residual transform block using the scan order.

11. The method of claim 4, wherein encoding the residual block using the prediction dependent transform coding includes:
    identifying a plurality of layers from the residual block based on the edge information block; and
    generating a plurality of shape adaptive transform blocks based on the plurality of layers.

12. The method of claim 11, wherein identifying the plurality of layers includes determining a plurality of layers including a first layer and a second layer, such that the first layer includes a first plurality of residual pixels from the residual block and a first plurality of average pixels, and the second layer includes a second plurality of residual pixels from the residual block and a second plurality of average pixels, wherein determining the plurality of layers includes:
    determining the first layer, such that edge information, from the edge information block, corresponding to each respective residual pixel from the first plurality of residual pixels indicates a magnitude that exceeds a threshold, wherein a value of each average pixel from the first plurality of average pixels is an average of the second plurality of residual pixels; and
    determining the second layer, such that edge information, from the edge information block, corresponding to each respective residual pixel from the second plurality of residual pixels indicates a magnitude that is within the threshold, wherein a value of each average pixel from the second plurality of average pixels is an average of the first plurality of residual pixels.

13. The method of claim 12, wherein generating the plurality of shape adaptive transform blocks includes:
   generating a first shape adaptive transform block by transforming the first layer using a first transform, and generating a second shape adaptive transform block by transforming the second layer using a second transform.

14. The method of claim 11, wherein generating the encoded block includes generating a plurality of encoded blocks, wherein generating the plurality of encoded blocks includes generating an encoded block for each respective shape adaptive transform block from the plurality of shape adaptive transform blocks, and wherein including the encoded block in the output bitstream includes including the plurality of encoded blocks in the output bitstream.

15. The method of claim 4, wherein determining the prediction dependent transform includes identifying the prediction dependent transform from a plurality of defined transforms based on the prediction block.

16. The method of claim 15, wherein the plurality of defined transforms includes a discrete cosine transform and a plurality of directional transforms.

17. The method of claim 15, wherein identifying the prediction dependent transform from the plurality of defined transforms includes identifying a predicted transform from the plurality of defined transforms, and wherein encoding the residual transform block includes encoding the residual transform block using entropy coding probabilities identified based on the predicted transform, the method further comprising:
   generating an encoded prediction dependent transform identifier by entropy coding an identifier indicating the prediction dependent transform using the entropy coding probabilities identified based on the predicted transform; and
   including the encoded prediction dependent transform identifier in the output bitstream.

18. A method comprising:
   identifying a current input block from a current input frame from an input video stream;
   generating a prediction block for the current input block;
   generating a residual block based on a difference between the current input block and the prediction block;
   generating, by a processor in response to instructions stored on a non-transitory computer readable medium, an encoded block by encoding the residual block based on the prediction block using a prediction dependent transform coding, wherein encoding the residual block using the prediction dependent transform coding includes:
      generating an edge information block based on the prediction block;
      determining the prediction dependent transform based on the edge information block,
      generating a residual transform block by transforming the residual block using the prediction dependent transform, and
      generating the encoded block by encoding the residual transform block;
   including the encoded block in an output bitstream; and
   outputting or storing the output bitstream.

19. The method of claim 18, wherein determining the prediction dependent transform includes:
   determining a prediction dependent transform mode;
   on a condition that the prediction dependent transform mode is a generating mode, generating the prediction dependent transform based on the edge information block;
   on a condition that the prediction dependent transform mode is an ordering mode, identifying a defined transform as the prediction dependent transform, wherein encoding the residual transform block includes:
      generating an edge information transform block by transforming the edge information block using the defined transform, wherein the edge information transform block includes a plurality of edge information transform coefficients in a first order,
      identifying a scan order indicating a second order of the plurality of edge information transform coefficients in descending order of magnitude, and
      entropy coding the residual transform block using the scan order;
   on a condition that the prediction dependent transform mode is a layering mode, identifying a plurality of layers from the residual block, wherein encoding the residual block using the prediction dependent transform coding includes:
      identifying a plurality of first layer locations from the edge information block within a first layer,
      identifying a plurality of second layer locations from the edge information block within a second layer,
      including a first plurality of residual pixels from the residual block in the first layer, wherein each residual pixel from the first plurality of residual pixels corresponds spatially with a first layer location from the plurality of first layer locations,
      including a second plurality of residual pixels from the residual block in the second layer, wherein each residual pixel from the second plurality of residual pixels corresponds spatially with a second layer location from the plurality of second layer locations,
      for each second layer location from the plurality of second layer locations, including in the first layer an average of the second plurality of residual pixels at a respective location in the first layer that corresponds spatially with a respective second layer location,
      for each first layer location from the plurality of first layer locations, including in the second layer an average of the first plurality of residual pixels at a respective location in the second layer that corresponds spatially with a respective first layer location,
      generating a first layer transform block by transforming the first layer using a first transform,
      generating a second layer transform block by transforming the second layer using a second transform,
      generating an encoded first layer transform block by encoding the first layer transform block, wherein including the encoded block in the output bitstream includes including the encoded first layer transform block in the output bitstream, and
      generating an encoded second layer transform block by encoding the second layer transform block, wherein including the encoded block in the output bitstream includes including the encoded second layer transform block in the output bitstream;
   on a condition that the prediction dependent transform mode is a select mode, identifying the prediction dependent transform from a plurality of defined transforms based on the prediction block; and on a condition that the prediction dependent transform mode is an express mode, identifying a predicted transform from the plurality of defined transforms, identifying the prediction dependent transform from the plurality of defined transforms, wherein encoding the residual transform block includes encoding the residual transform block using entropy coding probabilities identified based on the predicted transform, the method further comprising:

generating an encoded prediction dependent transform identifier by entropy coding an identifier indicating the prediction dependent transform using the entropy coding probabilities identified based on the predicted transform, and including the encoded prediction dependent transform identifier in the output bitstream.

20. A method comprising:

identifying a current input block from a current input frame from an input video stream;

generating a prediction block for the current input block;

generating a residual block based on a difference between the current input block and the prediction block;

generating an output bitstream, wherein generating the output bitstream includes encoding, by a processor in response to instructions stored on a non-transitory computer readable medium, the residual block based on the prediction block, wherein encoding the residual block based on the prediction block includes:

determining a prediction dependent transform mode;

on a condition that the prediction dependent transform mode is a generating mode, generating a prediction dependent transform based on edge information from the prediction block, generating a residual transform block by transforming the residual block using the prediction dependent transform, generating an encoded block based on the residual transform block, and including the encoded block in the output bitstream;

on a condition that the prediction dependent transform mode is a ordering mode, generating a residual transform block by transforming the residual using a defined transform, generating an edge information block based on the prediction block, generating an edge information transform block by transforming the edge information block using the defined transform, identifying a scan order representing a plurality of edge information transform coefficients from the edge information block in descending order of magnitude, generating an encoded block by entropy coding the residual transform block using the scan order, and including the encoded block in the output bitstream;

on a condition that the prediction dependent transform mode is a layering mode, generating an edge information block based on the prediction block, identifying a plurality of layers from the residual block based on the edge information block, generating a plurality of layer transform blocks by transforming each respective layer from the plurality of layers, generating a plurality of encoded layers by encoding each respective layer transform block from the plurality of layer transform blocks, and including the plurality of encoded layers in the output bitstream;

on a condition that the prediction dependent transform mode is a select mode, identifying a defined transform from a plurality of defined transforms based on the prediction block, generating a residual transform block by transforming the residual block using the defined transform, generating an encoded block based on the residual transform block, and including the encoded block in the output bitstream;

on a condition that the prediction dependent transform mode is an express mode, identifying a predicted transform based on the prediction block, identifying a defined transform from a plurality of defined transforms, generating a residual transform block by transforming the residual block using the defined transform, generating an encoded block by entropy coding the residual transform block based on entropy coding probabilities identified based on the predicted transform, including the encoded block in the output bitstream, generating an encoded transform identifier by entropy coding an identifier indicating the defined transform using the entropy coding probabilities identified based on the predicted transform, and including the encoded transform identifier in the output bitstream; and outputting or storing the output bitstream.

* * * * *